US012605797B2

(12) United States Patent
Yasugi

(10) Patent No.: US 12,605,797 B2
(45) Date of Patent: Apr. 21, 2026

(54) MACHINING SYSTEM, SEARCH METHOD, AND SEARCH PROGRAM

(71) Applicant: DMG MORI CO., LTD., Nara (JP)

(72) Inventor: Eisuke Yasugi, Nara (JP)

(73) Assignee: DMG MORI CO., LTD., Nara (JP)

( * ) Notice: Subject to any disclaimer, the term of this patent is extended or adjusted under 35 U.S.C. 154(b) by 0 days.

(21) Appl. No.: 18/571,855

(22) PCT Filed: Jun. 21, 2021

(86) PCT No.: PCT/JP2021/023366
§ 371 (c)(1),
(2) Date: Dec. 19, 2023

(87) PCT Pub. No.: WO2022/269674
PCT Pub. Date: Dec. 29, 2022

(65) Prior Publication Data
US 2024/0278366 A1 Aug. 22, 2024

(51) Int. Cl.
*B23Q 3/155* (2006.01)
*G06F 16/248* (2019.01)

(52) U.S. Cl.
CPC ........... *B23Q 3/155* (2013.01); *G06F 16/248* (2019.01)

(58) Field of Classification Search
None
See application file for complete search history.

(56) References Cited

U.S. PATENT DOCUMENTS

| | | | | |
|---|---|---|---|---|
| 2013/0332323 A1* | 12/2013 | Phillips | .................... | G07C 9/22 |
| | | | | 705/28 |
| 2016/0202690 A1* | 7/2016 | Kawai | .............. | G05B 19/40938 |
| | | | | 700/169 |
| 2017/0107090 A1* | 4/2017 | Mondal | ................ | G07C 5/0808 |
| 2017/0139403 A1 | 5/2017 | Saitou | | |
| 2018/0319590 A1* | 11/2018 | Lindbo | ................ | B65G 1/1373 |
| 2020/0210954 A1* | 7/2020 | Loi | ........................ | G06Q 30/04 |

(Continued)

FOREIGN PATENT DOCUMENTS

| | | |
|---|---|---|
| JP | 8215986 A | 8/1996 |
| JP | 6860735 B1 | 4/2021 |

(Continued)

OTHER PUBLICATIONS

Japanese Office Action for corresponding Application No. 2023-529205, issued Jul. 16, 2024, with English translation.

(Continued)

*Primary Examiner* — Yu Zhao
(74) *Attorney, Agent, or Firm* — Renner, Otto, Boisselle & Sklar, LLP.

(57) ABSTRACT

A machining system that uses a plurality of tools to machine a workpiece includes a display unit capable of displaying a search screen for searching for a tool. The search screen can accept input of a search condition related to the remaining lifespan of a tool. The machining system also includes a search unit for searching for a tool whose remaining lifespan or amount of usage satisfies the search condition, among the plurality of tools, based on the amount of usage of each of the tools from a new state. The search screen displays information regarding a tool that satisfies the search condition as a search result.

7 Claims, 18 Drawing Sheets

(56)          References Cited

U.S. PATENT DOCUMENTS

2021/0374815 A1*  12/2021  Smith ................. G07F 11/1657
2023/0315061 A1*  10/2023  Karakama .......... G05B 19/4183
                                                              700/108

FOREIGN PATENT DOCUMENTS

JP          2022024521  A      2/2022
WO          2015029232  A1     3/2015

OTHER PUBLICATIONS

Extended European Search Report for corresponding Application No. 21946965.7, issued Jul. 17, 2024.
International Search Report for corresponding Application No. PCT/JP2021/023366, issued Sep. 14, 2021, with English translation.
Written Opinion for corresponding Application No. PCT/JP2021/023366, issued Sep. 14, 2021, with English translation.
Japanese Office Action for corresponding Application No. 2023-529205, issued Nov. 19, 2024, with English translation.
Office Action issued for counterpart European Patent Application No. 21946965.7, mailed Jul. 15, 2025.

* cited by examiner

FIG.9

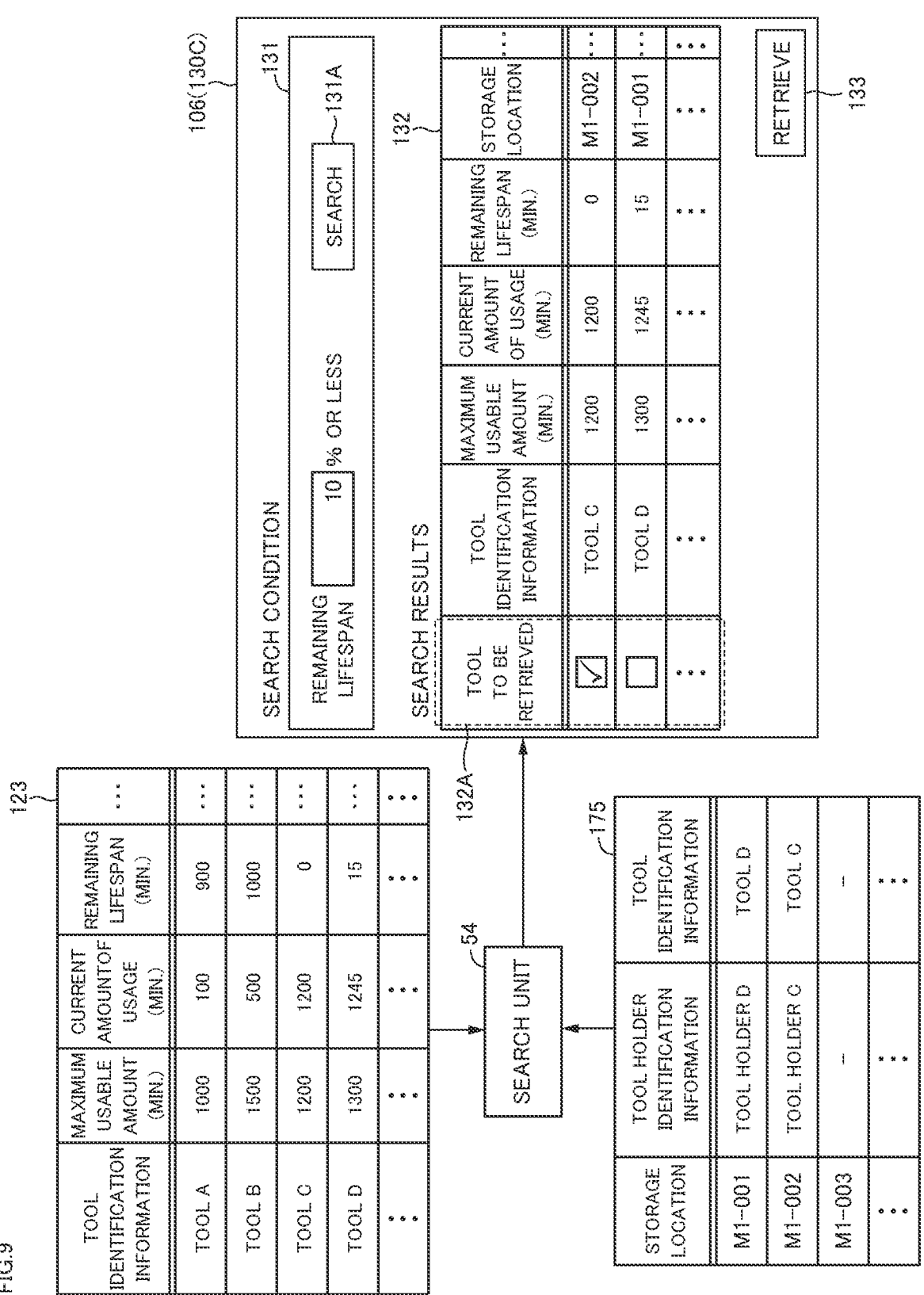

| TOOL IDENTIFICATION INFORMATION | MAXIMUM USABLE AMOUNT (MIN.) | CURRENT AMOUNT OF USAGE (MIN.) | REMAINING LIFESPAN (MIN.) | ... |
|---|---|---|---|---|
| TOOL A | 1000 | 100 | 900 | ... |
| TOOL B | 1500 | 500 | 1000 | ... |
| TOOL C | 1200 | 1200 | 0 | ... |
| TOOL D | 1300 | 1245 | 15 | ... |
| ... | ... | ... | ... | ... |

123

SEARCH UNIT   54

| STORAGE LOCATION | TOOL HOLDER IDENTIFICATION INFORMATION | TOOL IDENTIFICATION INFORMATION |
|---|---|---|
| M1-001 | TOOL HOLDER D | TOOL D |
| M1-002 | TOOL HOLDER C | TOOL C |
| M1-003 | – | – |
| ... | ... | ... |

175

106(130C)

SEARCH CONDITION    131

REMAINING LIFESPAN    10 % OR LESS    SEARCH  131A

SEARCH RESULTS    132

| TOOL TO BE RETRIEVED | TOOL IDENTIFICATION INFORMATION | MAXIMUM USABLE AMOUNT (MIN.) | CURRENT AMOUNT OF USAGE (MIN.) | REMAINING LIFESPAN (MIN.) | STORAGE LOCATION | ... |
|---|---|---|---|---|---|---|
| ☑ | TOOL C | 1200 | 1200 | 0 | M1-002 | ... |
| ☐ | TOOL D | 1300 | 1245 | 15 | M1-001 | ... |
| ... | ... | ... | ... | ... | ... | ... |

132A

RETRIEVE    133

| | | | | | | | Assigned Tool Data | | | |
| Seq. No. | Date | Time | Equip-ment | Tool Group | Cutting Time [min] | In MC Life Tool Sum [min] | Location | Tool ID | Remain Life [min] | Transfer Status |
|---|---|---|---|---|---|---|---|---|---|---|
| ... | | ... | ... | | | | | ... | | ... |
| 185 | 02/12 | 16:53 | MC_02 | 721,462 | 0:01 | 0:00 | CTS_01 | - | 1666:39 | - |
| 190 | 02/12 | 17:04 | MC_03 | 720,019 | 0:01 | 0:00 | Floor | - | 120:00 | Not yet |
| 191 | 02/12 | 17:04 | MC_03 | 720,032 | 0:01 | 0:00 | CTS_01 | - | 90:00 | - |
| 192 | 02/12 | 17:04 | MC_03 | 720,065 | 0:01 | 0:00 | Robot | 20,009,300 | 120:00 | Not yet |
| 193 | 02/12 | 17:04 | MC_03 | 720,081 | 0:01 | 0:00 | Robot | - | 90:00 | Ongoing |
| 195 | 02/12 | 17:04 | MC_03 | 720,145 | 0:01 | 0:00 | CTS_01 | 20,000,487 | 120:00 | Not yet |
| 196 | 02/12 | 17:04 | MC_03 | 720,147 | 0:01 | 0:00 | TSS | - | 120:00 | - |
| 197 | 02/12 | 17:04 | MC_03 | 720,205 | 0:01 | 0:00 | CTS_01 | 20,010,189 | 120:00 | - |
| 198 | 02/12 | 17:04 | MC_03 | 720,213 | 0:01 | 0:00 | CTS_01 | - | 120:00 | - |
| ... | ... | ... | ... | | | | | ... | | ... |

130

132

142

141

141A 141B 141C 141D 141E 141F 142A 142B 142C 142D 142E

MACHINING SYSTEM, SEARCH METHOD, AND SEARCH PROGRAM

This application is a national phase of International Application No. PCT/JP2021/023366 filed Jun. 21, 2021, which is hereby incorporated herein by reference in its entirety.

TECHNICAL FIELD

The present disclosure relates to a technology for searching tool information.

BACKGROUND ART

The larger the number of machine tools to manage is, the more difficult it is to manage tools used in each machine tool. In this respect, Patent Document 1 (International Publication No. 2015/029232) discloses a tool management system. A tool database is stored in this tool management system. Tool data specifies the length, diameter, or the like of each tool.

CITATION LIST

Patent Document

Patent Document 1: International Publication No. 2015/029232

SUMMARY OF INVENTION

Technical Problem

Each tool has a limited lifespan. It is recommended to replace a tool that has reached the end of the lifespan thereof with a new tool. The larger the number of tools used is, the more difficult tool replacement work is. Therefore, tool replacement work is performed altogether during a hiatus or the like. Here, for the efficiency of tool replacement work, it is favorable to perform replacement work not only for tools that have reached the end of the lifespan, but also for tools that are about to reach the end of the lifespan thereof.

To assist in such tool replacement work, there is demand for a technology for searching tool information using search conditions regarding the remaining lifespan of the tools. Note that Patent Document 1 mentioned above does not disclose anything regarding this type of technology.

Solution to Problem

In an example of the present disclosure, a machining system in which a plurality of tools are used to machine a workpiece includes a display unit capable of displaying a search screen for searching for a tool. The search screen is capable of accepting input of a search condition related to a remaining lifespan of a tool. The machining system also includes a search unit for searching for a tool whose remaining lifespan or amount of usage satisfies the search condition, among the plurality of tools, based on an amount of usage of each of the tools from a new state. The search screen displays, as a search result, information regarding a tool that satisfies the search condition.

In an example of the present disclosure, the machining system includes: a machine tool; a tool storage section in which a plurality of tools are able to be stored; a workstation for a worker to perform work for a tool; and a transfer device for transferring a designated tool among a tool in the machine tool, a tool in the tool storage section, and a tool in the workstation, to a designated delivery destination, which is one of the machine tool, the tool storage section, and the workstation. Search targets on the search screen include a tool in the machine tool, a tool in the tool storage section, and a tool in the workstation.

In an example of the present disclosure, the search screen is capable of accepting a selection operation to select a piece of information regarding each tool displayed as the search result. The machining system further includes a transfer control unit for controlling the transfer device so as to transfer a tool corresponding to the piece of information selected by the selection operation to the workstation.

In an example of the present disclosure, information regarding each tool displayed as the search result on the search screen includes identification information regarding the tool, and a remaining lifespan of the tool or an amount of usage of the tool.

In an example of the present disclosure, the information regarding each tool displayed as the search result on the search screen further includes information regarding a property of the tool.

In an example of the present disclosure, the information regarding each tool displayed as the search result on the search screen further includes a classification of the tool.

In an example of the present disclosure, the search unit searches for a tool whose remaining lifespan satisfies the search condition among the plurality of tools. The search condition able to be input on the search screen includes at least one of a proportion of a remaining lifespan of a tool to a lifespan of the tool from a new state and a proportion of an amount of usage of the tool to the lifespan of the tool from the new state.

In another example of the present disclosure, a search method for searching for a specific tool among a plurality of tools to be used in a machining system is provided. The search method includes: a step of displaying a search screen for searching for a tool; a step of accepting input of a search condition related to a remaining lifespan of a tool on the search screen; a step of searching for a tool whose remaining lifespan or amount of usage satisfies the search condition, among the plurality of tools, based on an amount of usage of each of the tools from a new state; and a step of displaying information regarding a tool that satisfies the search condition as a search result on the search screen.

In another example of the present disclosure, a search program for searching for a specific tool among a plurality of tools to be used in a machining system is provided. The search program causes a computer to execute: a step of displaying a search screen for searching for a tool; a step of accepting input of a search condition related to a remaining lifespan of a tool on the search screen; a step of searching for a tool whose remaining lifespan or amount of usage satisfies the search condition, among the plurality of tools, based on an amount of usage of each of the tools from a new state; and a step of displaying information regarding a tool that satisfies the search condition as a search result on the search screen.

The above and other objects, features, aspects and advantages of the present invention will become apparent from the following detailed description of the invention as understood in connection with the accompanying drawings.

BRIEF DESCRIPTION OF THE DRAWINGS

FIG. 9 schematically shows a flow of search processing according to Variation 3.

DESCRIPTION OF EMBODIMENTS

Hereinafter, embodiments according to the present invention will be described with reference to the drawings. In the following description, identical components and constituent elements are given identical reference signs. Those components and constituent elements also have the same names and functions. Accordingly, detailed descriptions thereof are not repeated. Note that the following embodiments and variations may be selectively combined as appropriate.

A. Overview

Figure 1:
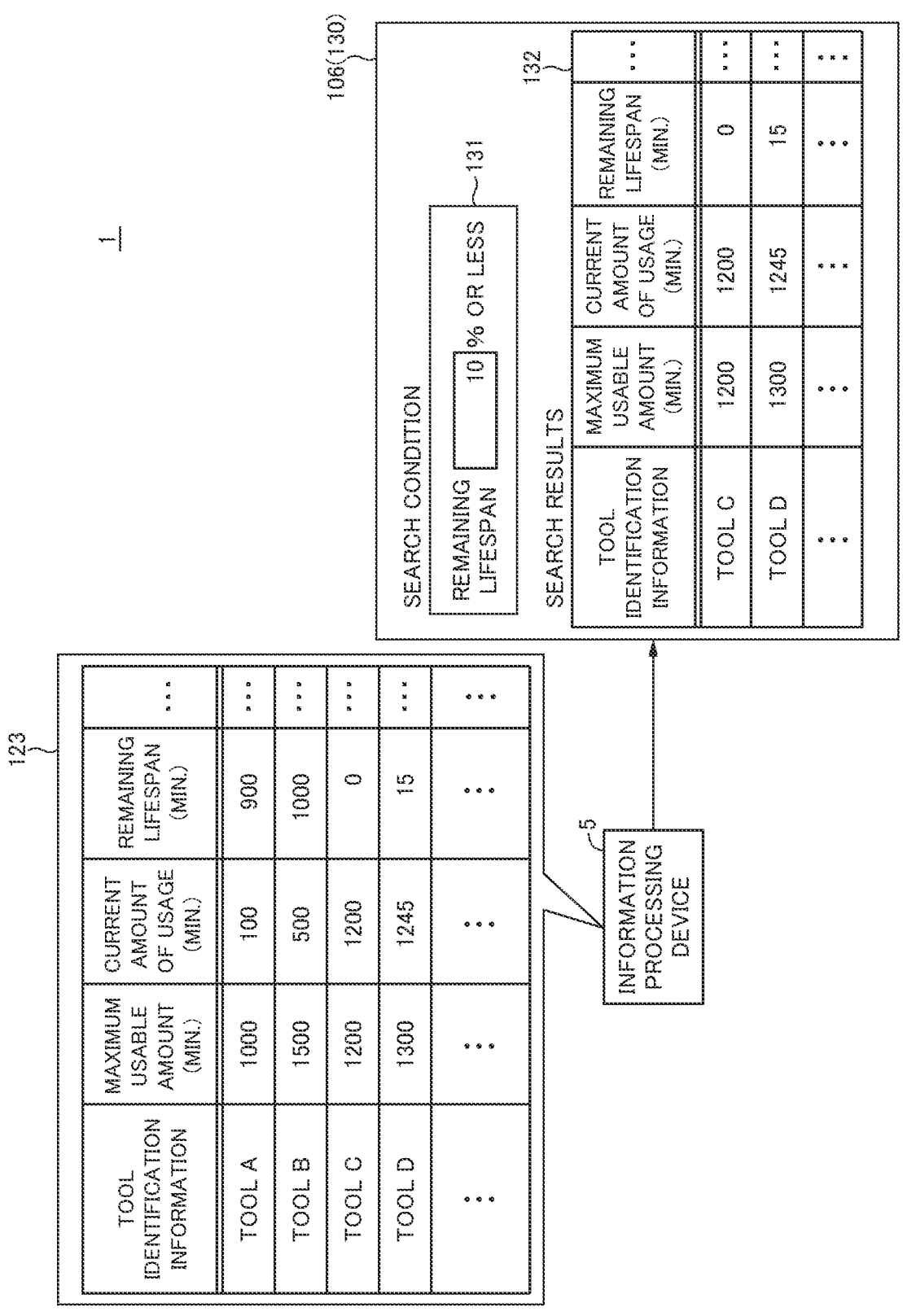
FIG. 1 schematically shows a flow of tool information search processing.

An overview of a tool search function is described with reference to FIG. 1. FIG. 1 schematically shows a flow of tool information search processing.

A machining system 1 is shown in FIG. 1. The machining system 1 is a system capable of machining a workpiece using a plurality of tools. The machining system 1 includes an information processing device 5 and a display 106 (display unit).

The information processing device 5 is a device for managing the tools used in the machining system 1. The information processing device 5 may be constituted by a single computer or a plurality of computers. The computer may be a desktop PC (Personal Computer), a laptop PC, or a mobile terminal. As an example, the information processing device 5 is a later-described management device 100 (see FIG. 3) or a later-described operation terminal 200A (see FIG. 3).

The display 106 is, for example, a liquid-crystal display, an organic EL (Electro Luminescence) display, or other display equipment. The display 106 may be integrated with or separate from the information processing device 5.

A tool database 123 is stored in the information processing device 5. Various types of information regarding the tools are specified in the tool database 123. As an example, in the tool database 123, the maximum usable time of a tool, the current amount of usage of the tool, and the remaining lifespan of the tool are associated with each other according to identification information regarding each tool.

The identification information regarding each tool specified in the tool database 123 is information for uniquely identifying the tool. The identification information is assigned to each tool in advance. As an example, the identification information may be indicated by a tool number such as an ID (Identification), or a tool name.

The maximum usable amount specified in the tool database 123 is an indicator of the amount of usage of the tool from the new state until the tool reaches the end of the lifespan thereof. The term "maximum usable amount of a tool" includes, for example, the time that the tool can be used for machining from the new state until the tool reaches the end of the lifespan thereof, the distance that the tool can move during machining from the new state until the tool reaches the end of the lifespan thereof, and the number of times that the tool can be used from the new state until the tool reaches the end of the lifespan thereof.

The current amount of usage specified in the tool database 123 is an indicator of the amount of usage of the tool from the new state to the present. The term "amount of usage of a tool" includes, for example, the total time that the tool has been used for machining since the new state to the present, the total distance that the tool has moved during machining since the new state to the present, and the total number of times that the tool has been used since the new state to the present.

The remaining lifespan specified in the tool database 123 is an indicator of the amount of usage of the tool from the present until the tool reaches the end of the lifespan thereof. The term "remaining lifespan of a tool" includes, for example, the time that the tool can be used for machining from the present until the tool reaches the end of the lifespan thereof, the distance that the tool can move during machining from the present until the tool reaches the end of the lifespan thereof, and the number of times that the tool can be used from the present until the tool reaches the end of the lifespan thereof.

The information processing device 5 has a function of searching tool information. The search function is realized by a search screen 130 for searching tool information, for example. The search screen 130 is displayed on the display 106, for example.

The search screen 130 accepts input of various search conditions. A search condition may be input to an input area 131 of the search screen 130. Input of the search condition to the input area 131 is realized by operating an input device, such as a mouse, or by touching the display 106, for example.

The search screen 130 accepts input of a search condition related to the remaining lifespan of tools. In the example in FIG. 1, the search screen 130 accepts the proportion of the remaining lifespan of a tool to the maximum usable amount of the tool (hereinafter also referred to as "remaining lifespan proportion") as a search condition.

The information processing device 5 identifies tools whose remaining lifespan satisfies the search condition among the tools specified in the tool database 123, based on the current amount of usage of each tool used in the machining system 1. Thereafter, the search screen 130 displays information regarding the identified tools in a display field 132 for search results.

In the example in FIG. 1, a remaining lifespan proportion of "10% or less" is input as a search condition. In this case, the information processing device 5 identifies tool information including a remaining lifespan proportion of "10% or less" from the tool database 123. In the example in FIG. 1, the remaining lifespan proportion of a tool A is 90% (=900/1000), the remaining lifespan proportion of a tool B is approximately 67% (=1000/1500), the remaining lifespan proportion of a tool C is 0% (=0/1200), and the remaining lifespan proportion of a tool D is 1.1% (=15/1300). Therefore, the search screen 130 displays information regarding the tool C and the tool D in the display field 132.

Thus, the worker can search tool information with a search condition related to the remaining lifespan by means of the search function of the machining system 1. This allows the worker to understand not only tools that have reached the end of the lifespan thereof but also tools that are about to reach the end of the lifespan thereof. As a result, the worker can identify tools that are better to be replaced now.

The search function may be used during a hiatus of the worker, for example. The hiatus includes a time period before the worker switches with the next worker, and a time period before a holiday such as a Saturday or a Sunday. The worker can efficiently perform tool replacement work by replacing not only tools that have reached the end of the lifespan thereof but also tools that are about to reach the end of the lifespan thereof, during a hiatus.

Note that the search condition that can be input is not limited to the remaining lifespan proportion. As an example, search conditions that can be input include the proportion of the amount of usage of each tool to the maximum usable amount of the tool (hereinafter also referred to as "usage amount proportion"). In this case, the information processing device 5 specifies a tool with an amount of usage that satisfies the search condition from among the tools specified in the tool database 123.

B. Tool Transfer System 10

Next, a tool transfer system 10, which is an example of the aforementioned machining system 1, is described with reference to FIG. 2.

The following is a description of the tool transfer system 10 as an example of the machining system 1, but the machining system 1 is not limited to the tool transfer system 10. The machining system 1 need not necessarily have an automatic tool transfer function. As an example, the machining system 1 may be constituted by the aforementioned information processing device 5 and a plurality of machine tools.

Figure 2:
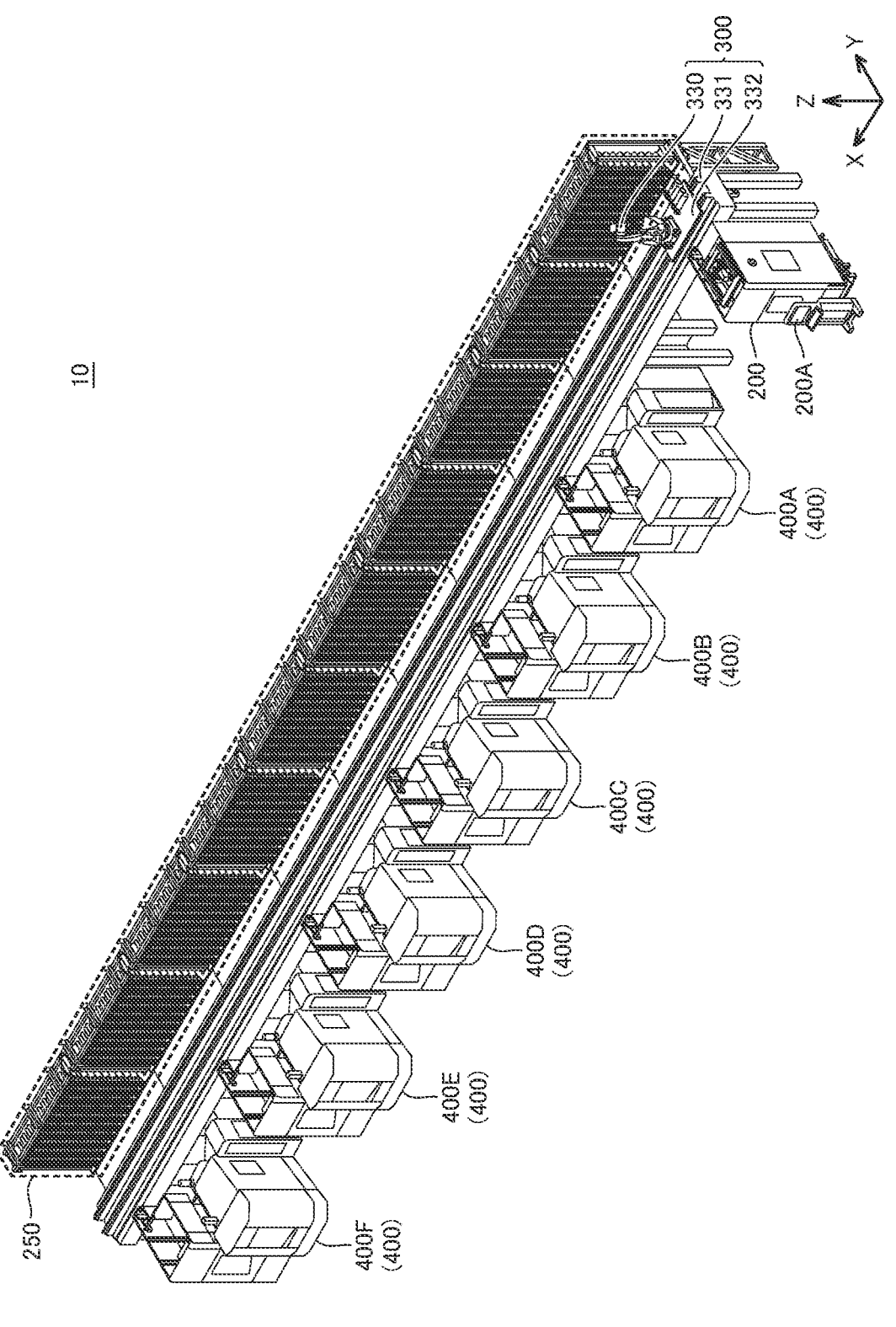
FIG. 2 shows an outer appearance of a tool transfer system.

FIG. 2 shows an outer appearance of the tool transfer system 10. As shown in FIG. 2, the tool transfer system 10 includes a workstation 200, a tool storage section 250, a transfer device 300, and machine tools 400.

The workstation 200 is a place where a worker performs work for tool holders. A tool holder is a pod capable of holding a tool. For example, the worker performs work to set tool holders or work to retrieve tool holders at the workstation 200.

The workstation 200 includes an operation terminal 200A. The operation terminal 200A accepts various operations made to the tool transfer system 10.

A plurality of tool holders may be stored in the tool storage section 250. The tool storage section 250 functions as a temporary storage place for the tool holders.

The transfer device 300 transfers a designated tool holder among tool holders in the workstation 200, tool holders in the tool storage section 250, and tool holders in the machine tools 400, to a designated transfer destination, which is one of the workstation 200, the tool storage section 250, and the machine tools 400.

In the following, a transfer mode in which the transfer device 300 carries a tool holder from the workstation 200 to the tool storage section 250 or any of the machine tools 400, or a transfer mode in which the transfer device 300 carries a tool holder from the tool storage section 250 to any of the machine tools 400 is also expressed as "to deliver".

Further, a transfer mode in which the transfer device 300 carries a tool holder from the tool storage section 250 or any of the machine tools 400 to the workstation 200, or a transfer mode in which the transfer device 300 carries a tool holder from any of the machine tools 400 to the tool storage section 250 is also expressed as "to remove (move)".

The term "transfer device" as used herein is a concept that encompasses various devices with a function of transferring tool holders. The following description takes a four- to seven-axis drive articulated robot as an example of the transfer device 300, but the transfer device 300 is not limited to an articulated robot. As an example, the transfer device 300 may alternatively be a two- or three-axis drive orthogonal robot (autoloader). Alternatively, the transfer device 300 may be a self-propelled robot.

The transfer device 300 includes an arm robot 330, rails 331, and a shuttle 332. The arm robot 330 is fixed to the upper part of the shuttle 332. The shuttle 332 is movable on the rails 331. The tool storage section 250 and the machine tools 400 are arranged with the rails 331 therebetween and parallel with the rails 331.

Each machine tool 400 is one of the transfer destinations, i.e. destinations to which the transfer device 300 transfers a tool holder. FIG. 2 shows six machine tools 400A to 400F as the machine tools 400, but the number of machine tools 400 in the tool transfer system 10 need only be at least one. Each machine tool 400 machines a workpiece in accordance with a pre-designed machining program, using a designated tool.

The term "machine tool" as used herein is a concept that encompasses various devices with a function of machining a workpiece. The machine tool 400 may be a horizontal machining center or a vertical machining center. Alternatively, the machine tool 400 may be a lathe, an additive machine, or any other cutting or grinding machine.

Search targets on the aforementioned search screen 130 include tools in the tool storage section 250, tools in the workstation 200, and tools in the machine tool 400. This allows the worker to search for tools that satisfy the search condition among the tools in the tool transfer system 10.

Note that the tool transfer system 10 may also include a pallet transfer system (not shown). A pallet transfer system is a system for transferring pallets each carrying a workpiece to the machine tools 400 in accordance with a predetermined machining schedule. With this, the tool transfer system 10 has not only an automatic tool transfer function but also an automatic workpiece transfer function.

C. Drive Mechanism of Tool Transfer System 10

Figure 3:
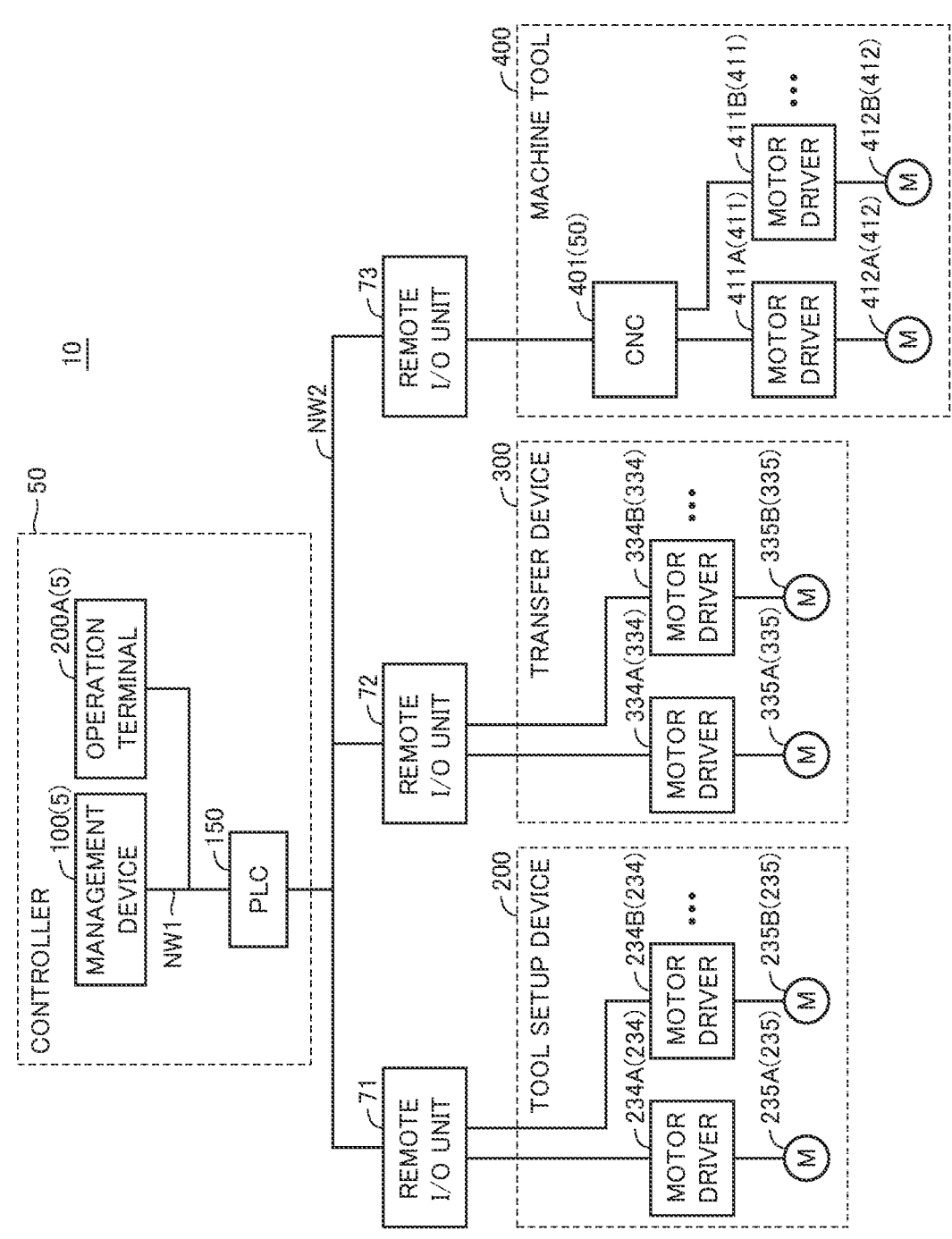
FIG. 3 shows a configuration example of drive mechanisms of the tool transfer system.

Next, various drive mechanisms in the tool transfer system 10 are described with reference to FIG. 3. FIG. 3 shows a configuration example of drive mechanisms of the tool transfer system 10.

As shown in FIG. 3, the tool transfer system 10 includes a controller 50, a remote I/O (Input/Output) units 71 to 73, the workstation 200, the transfer device 300, and the machine tool 400.

The term "controller 50" as used herein means a device that controls the tool transfer system 10. The controller 50 may have any device configuration. The controller 50 may be constituted by a single control unit or a plurality of control units. In the example in FIG. 3, the controller 50 includes a management device 100, a PLC 150, and the aforementioned operation terminal 200A. The controller 50 may also include a CNC (Computer Numerical Control) 401.

The management device 100 is an example of the aforementioned information processing device 5. The management device 100 is a main computer that manages the tool transfer system 10. The management device 100 may be constituted by a single computer or a plurality of computers.

The PLC 150 can communicate with various industrial devices for automating machining processes, and controls these industrial devices.

The operation terminal 200A is an example of the aforementioned information processing device 5. The operation terminal 200A is a terminal for accepting various operations related to delivery and removal of tool holders.

The management device 100, the PLC 150, and the operation terminal 200A are connected to a network NW1. The management device 100, the PLC 150, and the operation terminal 200A may be communicatively connected by wire or wirelessly. The network NW1 uses EtherNET (registered trademark) or the like. The management device 100 and the operation terminal 200A send a control command to the PLC 150 via the network NW1. The control command specifies a tool holder to be transferred, a transfer destination of the tool holder, start/stop of transfer of the tool holder, or the like.

The remote I/O units 71 to 73 and the PLC 150 are connected to a network NW2. The network NW2 preferably is a field network that performs periodic communication and guarantees the arrival time of data. As a field network that performs such periodic communication, EtherCAT (registered trademark), EtherNet/IP (registered trademark), CC-Link (registered trademark), CompoNet (registered trademark), or the like is adopted.

The workstation 200 includes at least one motor driver 234 and at least one motor 235. FIG. 3 shows an example of two motor drivers 234A and 234B and two motors 235A and 235B.

The remote I/O unit 71 is installed in or around the workstation 200. The remote I/O unit 71 mediates data exchange between the PLC 150 and various drive units (e.g. motor drivers 234) in the workstation 200. As an example, each of the motor drivers 234 receives a control command from the PLC 150 via the remote I/O unit 71 at regular periods and controls driving of a corresponding motor 235 in accordance with the control command.

For example, the motor 235A controls driving of a later-described magazine M1 (see FIG. 12), which is located in the workstation 200. For example, the motor 235B controls driving of an ATC (Automatic Train Control) in the workstation 200.

For example, each motor driver 234 may be a driver for a servo motor or a driver for a stepping motor. Each motor 235 may be a servo motor or a stepping motor.

The transfer device 300 includes at least one motor driver 334 and at least one motor 335. FIG. 3 shows an example of two motor drivers 334A and 334B and two motors 335A and 335B.

The remote I/O unit 72 is installed in or around the transfer device 300. The remote I/O unit 72 mediates data exchange between the PLC 150 and various drive units (e.g. motor drivers 334) in the transfer device 300. As an example, each of the motor drivers 334 receives a control command from the PLC 150 via the remote I/O unit 72 at regular periods and controls driving of a corresponding motor 335 in accordance with the control command.

For example, the motor 335A controls driving of the aforementioned shuttle 332 (see FIG. 2). For example, the motor 335B controls driving of the arm robot 330 (see FIG. 2). The number of motors 335B corresponds to the number of joints of the arm robot 330.

For example, each motor driver 334 may be a driver for a servo motor or a driver for a stepping motor. Each motor 335 may be a servo motor or a stepping motor.

The machine tool 400 includes a CNC 401, at least one motor driver 411, and at least one motor 412. FIG. 3 shows an example of two motor drivers 411A and 411B and two motors 412A and 412B.

The remote I/O unit 72 is installed in or around the machine tool 400. The remote I/O unit 72 mediates data exchange between the PLC 150 and various drive units (e.g. CNC 401) in the machine tool 400. Similar to the motor drivers 334, each of the motor drivers 411 receives a control command from the PLC 150 via the remote I/O unit 72 at regular periods and controls driving of a corresponding motor 412 in accordance with the control command.

For example, the motor 412A drives a main shaft, to which a tool can be attached, in an axial direction of the main shaft. For example, the motor 412B drives the main shaft to rotate in a rotational direction about the axial direction of the main shaft.

For example, each motor driver 411 may be a driver for a servo motor or a driver for a stepping motor. Each motor 412 may be a servo motor or a stepping motor.

D. Functional Constituents of Tool Transfer System 10

Figure 4:
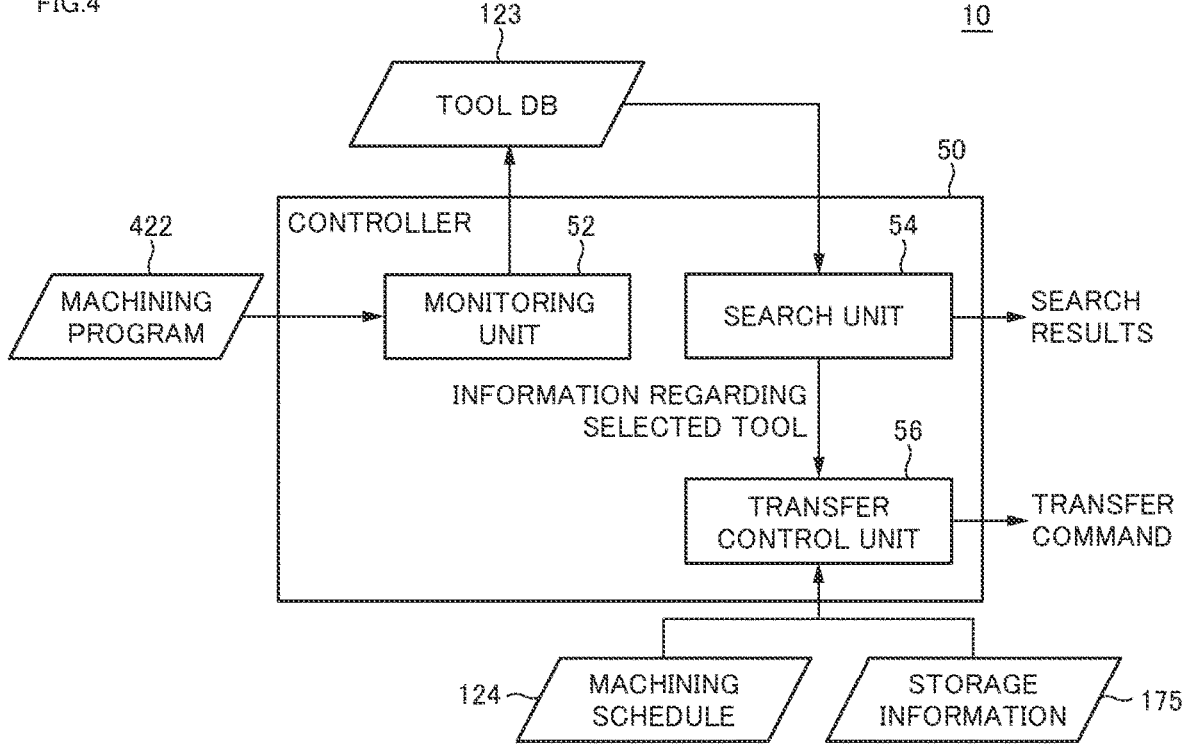
FIG. 4 shows an example of functional constituents of the tool transfer system.

Next, functional constituents for realizing processing to transfer tool holders is described with reference to FIGS. 4 to 6. FIG. 4 shows an example of functional constituents of the tool transfer system 10.

As shown in FIG. 4, the tool transfer system 10 includes, as functional constituents, a monitoring unit 52, a search unit 54, and a transfer control unit 56. These constituents are described in order below.

Note that the functional constituents may be arranged in any manner. Some or all of the functional constituents shown in FIG. 4 may be implemented in the aforementioned management device 100 (see FIG. 2), the aforementioned PLC 150 (see FIG. 2), the aforementioned operation terminal 200A (see FIG. 2), or the aforementioned CNC 401 (see FIG. 2).

D1. Monitoring Unit 52

First, a function of the monitoring unit 52 shown in FIG. 4 is described with reference to FIG. 1 described above. The monitoring unit 52 is implemented by, for example, the aforementioned PLC 150 or the aforementioned CNC 401.

The monitoring unit 52 monitors a machining program 422 of the machine tool 400 and counts the amount of usage of each tool in the machine tool 400 from the new state to the present. Thereafter, the monitoring unit 52 updates the tool database 123 shown in FIG. 1, based on the counted amount of usage.

As an example, the machining program 422 for a workpiece includes a tool replacement command for designating a tool to be attached to the main shaft of the machine tool 400, a drive command for rotating or feeding the main shaft or the tool, or the like. The monitoring unit 52 stores the identification information regarding the tool when the tool replacement command specified in the machining program 422 is executed. Next, the monitoring unit 52 starts counting the amount of usage of the tool based on the drive command specified in the machining program 422 being executed. Next, the monitoring unit 52 stops counting the amount of usage of the tool based on a stop command specified in the machining program 422 or a command in the last line being executed. Next, the monitoring unit 52 references the tool database 123 and adds the counted amount of usage to the current amount of usage associated with the stored identification information. Thus, the monitoring unit 52 regularly updates the current amount of usage of each tool.

Further, when updating the current amount of usage of each tool specified in the tool database 123, the monitoring unit 52 also updates the remaining lifespan of each tool specified in the tool database 123. Typically, the monitoring unit 52 updates the remaining lifespan based on the result of subtracting the current amount of usage of the tool from the maximum usable amount of the tool.

D2. Search Unit 54

Next, a function of the search unit 54 shown in FIG. 4 is described with reference to FIG. 5.

The search unit 54 is implemented by the aforementioned management device 100 or the aforementioned operation terminal 200A, for example. The search unit 54 searches the tool database 123 for tool information that satisfies an input search condition, and outputs the search results.

Figure 5:
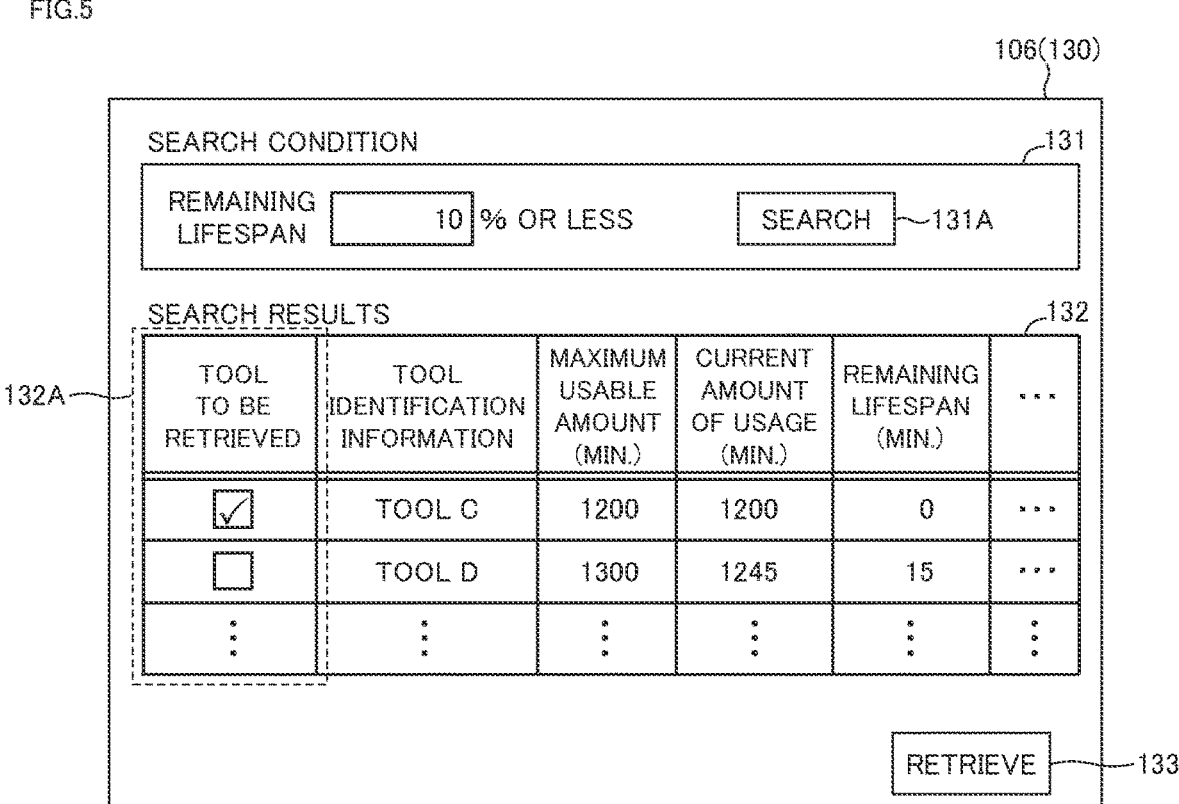
FIG. 5 shows an example of a search screen.
Figure 6:
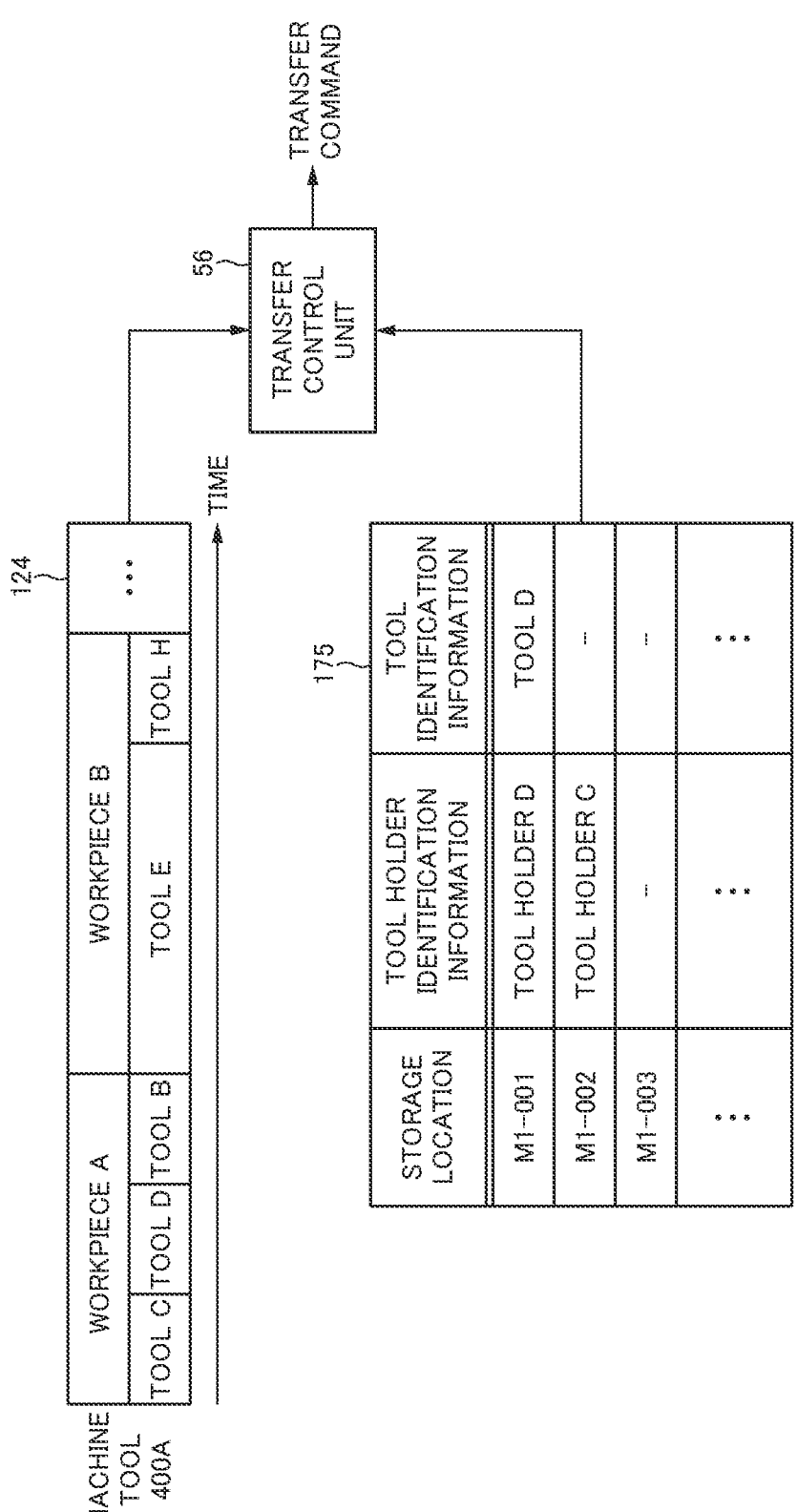
FIG. 6 shows an example of input to a transfer control unit and output of the transfer control unit in response to the input.

FIG. 5 shows an example of a search screen 130. The search screen 130 includes an input area 131, a display field 132 for search results, and a retrieval button 133.

The input area 131 accepts input of various search conditions. Input of a search condition to the input area 131 is realized by operating an input device, such as a mouse, or by touching the display 106, for example.

The search unit 54 identifies tools that satisfy the input search condition among the tools specified in the tool database 123, based on a search execution button 131A in the input area 131 being pressed. Thereafter, the search unit 54 displays information regarding the identified tools in a display field 132 for the search results. The search results displayed in the display field 132 include, for example, identification information regarding the tools, the usable time of the tools, the current time of usage of the tools, and the remaining lifespan of the tools.

The search screen 130 is capable of accepting a selection operation made to each piece of the tool information displayed as search results. In the example in FIG. 5, the selection operation is made to a checkbox 132A. The status of the checkbox 132A switches between a selected state and a non-selected state each time the worker presses the checkbox 132A.

The checkboxes 132A are provided according to the number of pieces of tool information displayed in the display field 132 for search results. Typically, the checkboxes 132A are arranged next to respective pieces of tool information displayed in the display field 132 for search results.

Based on the retrieval button 133 being pressed with a checkbox 132A selected, the search unit 54 outputs the selected piece of tool information to the transfer control unit 56.

D3. Transfer Control Unit 56

Next, a function of the transfer control unit 56 shown in FIG. 4 is described with reference to FIG. 6 as well as FIG. 5 described above. FIG. 6 shows an example of input to the transfer control unit 56 and output of the transfer control unit 56 in response to the input.

The transfer control unit 56 is implemented by the aforementioned PLC 150, for example. For example, the transfer control unit 56 receives a machining schedule 124 and storage information 175 as input, and outputs a command to transfer a tool holder to the transfer device 300.

The machining schedule 124 specifies, for example, a scheduled machining timing for each workpiece in each of the machine tools 400, and tools used in each machining process. FIG. 6 shows an example of the machining schedule 124 for the machine tool 400A.

The storage information 175 associates identification information regarding a tool holder stored at a storage location and identification information regarding a tool held by this tool holder with each other according to each of the storage locations where tool holders are stored in the tool transfer system 10.

The storage locations specified in the storage information 175 are information for uniquely identifying the location of each tool holder in the tool transfer system 10. As an example, each storage location indicates any of the storage location of a tool holder in the workstation 200, the storage location of a tool holder in the tool storage section 250, the storage location of a tool holder in the transfer device 300, and the storage location of a tool holder in the machine tool 400.

The identification information regarding each tool holder specified in the storage information 175 is information for uniquely identifying the tool holder. The identification information is assigned to each tool holder in advance. The identification information may be indicated by a tool holder number such as an ID, or a tool holder name.

The identification information regarding each tool specified in the storage information 175 is information for uniquely identifying the tool. The identification information is assigned to each tool in advance. The identification information may be indicated by a tool number such as an ID, or a tool name. This identification information corresponds to the identification information regarding each tool specified in the aforementioned tool database 123 (see FIG. 1).

The transfer control unit 56 references the machining schedule 124 and identifies the tool to be used, before the machine tool 400 starts machining a workpiece. Next, the transfer control unit 56 references the storage information 175, and if the tool to be used is not present in the target machine tool 400, the transfer control unit 56 causes the transfer device 300 to deliver the tool to be used from the workstation 200 or the tool storage section 250 to the target machine tool 400.

Further, the transfer control unit 56 controls the transfer device 300 so as to transfer, to the workstation 200, a tool corresponding to each piece of tool information selected in the display field 132 for search results.

The location where the tool holder to be removed is stored is identified based on the storage information 175. More specifically, the transfer control unit 56 references the storage information 175 and identifies the storage location for each piece of tool information selected in the display field 132 for search results. The transfer control unit 56 then determines the tool holder holding the identified tool as a tool holder to be removed. As a result, tools that have reached the end of the lifespan thereof or tools that are about to reach the end of the lifespan thereof are removed from the tool storage section 250 or the machine tool 400 and moved to the workstation 200.

E. Variation 1 of Search Processing

Figure 7:
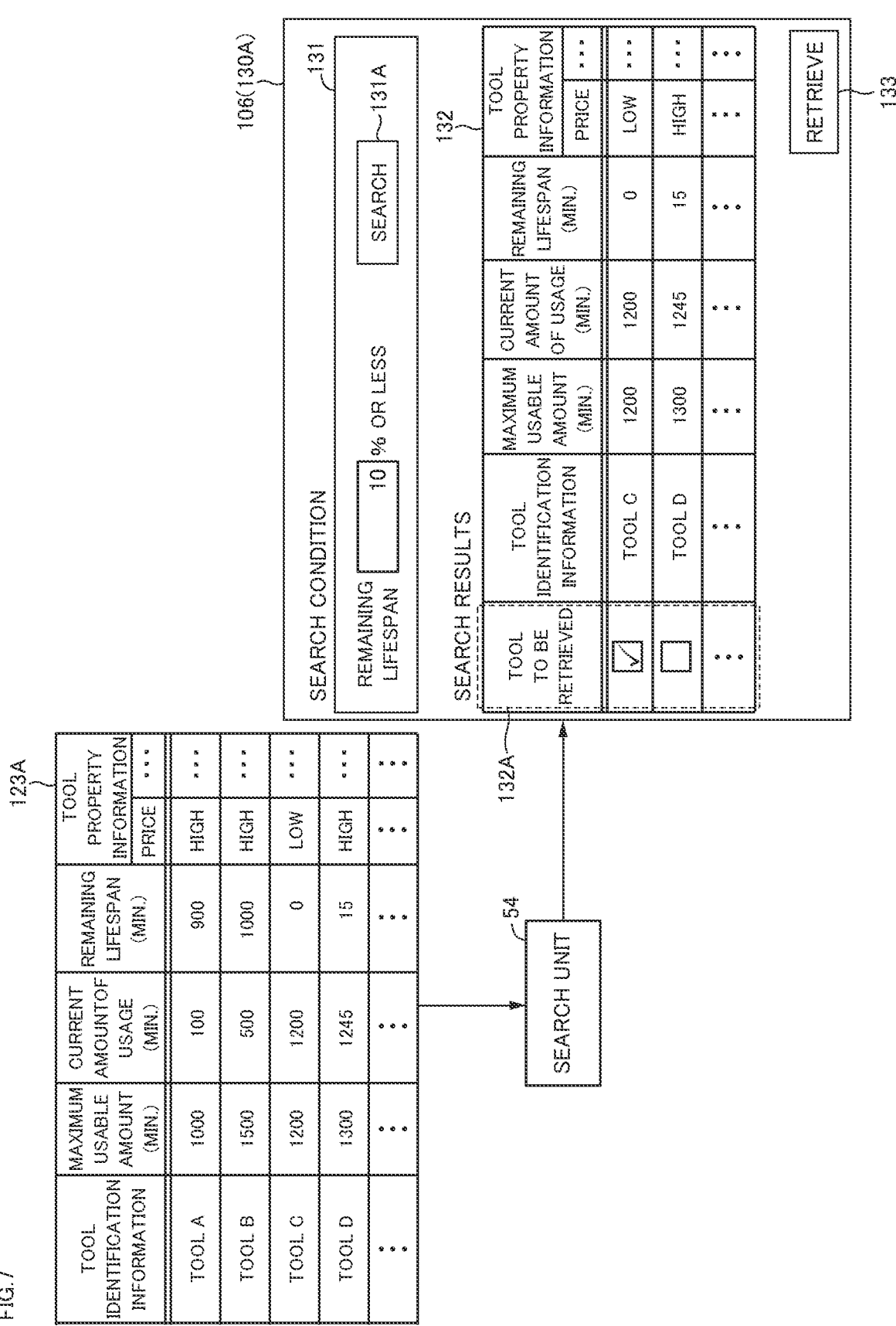
FIG. 7 schematically shows a flow of search processing according to Variation 1.

Next, Variation 1 of search processing performed by the search unit 54 is described with reference to FIG. 7. FIG. 7 schematically shows a flow of search processing according to Variation 1.

The tool database 123 shown in FIG. 1 described above associates the usable time of a tool, the current time of usage of the tool, and the remaining lifespan of the tool with each other according to identification information regarding each tool. In contrast, a tool database 123A according to this variation also associates information regarding properties of the tool (hereinafter also referred to as "tool property information") according to identification information regarding each tool.

The tool property information includes, for example, an indicator of the price of a tool, an indicator of the difficulty level of measurement work for the tool, an indicator of a skill required for handling the tool, and an indicator of the importance of the tool.

The indicator of the value of a tool includes the price of the tool and classification such as high price or low price. The value of each tool may be set in advance or may be set in any manner by a user.

The indicator of the difficulty level of measurement work for a tool includes a numerical value correlated with the difficulty level, a flag indicating whether or not the measurement work is difficult, and identification information regarding a measuring instrument necessary for the measurement work. The difficulty level of each tool may be set in advance, or may be set in any manner by a user.

The indicator of a skill required for handling a tool includes a numerical value correlated with the difficulty level, and identification information regarding a worker authorized to handle the tool. The indicator of a skill for handling each tool may be set in advance, or may be set in any manner by a user.

The importance of a tool includes a numerical value correlated with the importance and a flag indicating whether or not the tool is important. The importance of each tool of each tool may be set in advance, or may be set in any manner by a user.

The search unit 54 accepts input of a search condition, and searches the tool database 123A for tool information that satisfies the input search condition. As an example, search conditions that can be input include the remaining lifespan proportion of a tool. In this case, the search unit 54 searches the tool database 123A for tool information indicating a remaining lifespan proportion less than or equal to the input remaining lifespan proportion. The search results are displayed in the display field 132 of the search screen 130A. In the example in FIG. 7, identification information regarding tools, the usable time of the tools, the current time of usage of the tools, the remaining lifespan of the tools, and property information regarding the tools are displayed as search results on the search screen 130A.

As another example, search conditions that can be input include tool property information. As an example, if a lower limit value of the price is input as a search condition, the search unit 54 searches the tool database 123A for tool information whose price is higher than or equal to the lower limit value. The search results are displayed in the display field 132 of the search screen 130A. Note that the search condition may be designated by a combination of the remaining lifespan proportion of a tool and tool property information.

F. Variation 2 of Search Processing

Figure 8:
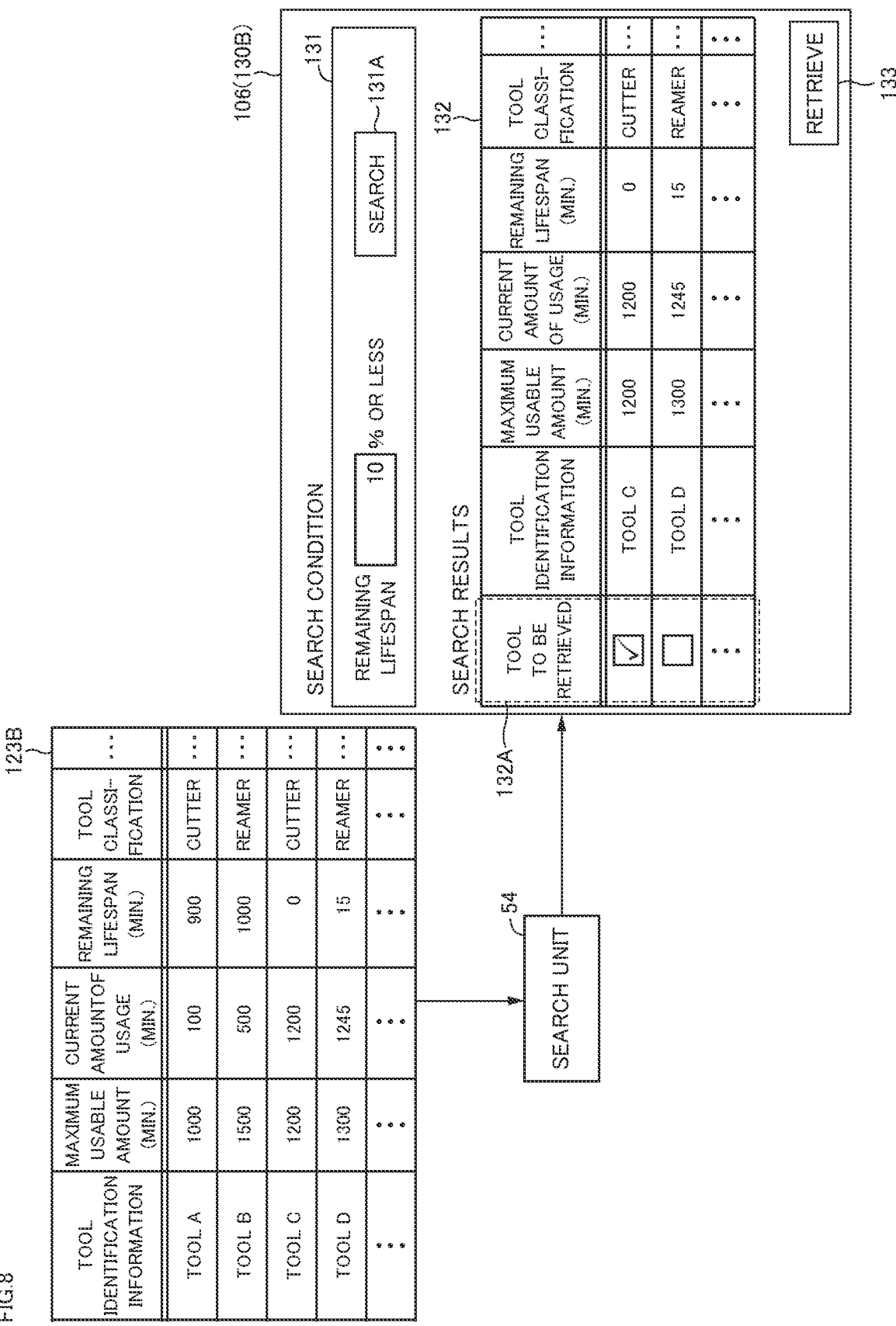
FIG. 8 schematically shows a flow of search processing according to Variation 2.

Next, Variation 2 of search processing performed by the search unit 54 is described with reference to FIG. 8. FIG. 8 schematically shows a flow of search processing according to Variation 2.

The tool database 123 shown in FIG. 1 associates the usable time of a tool, the current time of usage of the tool, and the remaining lifespan of the tool with each other according to identification information regarding each tool. In contrast, the tool database 123B according to this variation also associates a tool classification according to the identification information regarding each tool. Tool classifications and tools pertaining to each classification are specified in advance. The tool classification includes, for example, a cutter, a reamer, and another classification name.

The search unit 54 accepts input of a search condition, and searches the tool database 123B for tool information that satisfies this search condition. As an example, search conditions that can be input include the remaining lifespan proportion of a tool. In this case, the search unit 54 searches the tool database 123B for tool information indicating a remaining lifespan proportion less than or equal to the input remaining lifespan proportion. The search results are displayed in a display field 132 of a search screen 130B. In the example in FIG. 8, classifications of tools, identification information regarding the tools, the usable time of the tools, the current time of usage of the tools, the remaining lifespan of the tools, and the property information regarding the tools are displayed on the search screen 130B.

As another example, search conditions that can be input include a tool classification. As an example, if a tool classification is input as a search condition, the search unit 54 searches the tool database 123B for tool information that matches the input classification, and displays the tool information on the search screen 130B. Note that the search condition may be designated by a combination of the remaining lifespan proportion of a tool and a tool classification.

G. Variation 3 of Search Processing

Next, Variation 3 of search processing performed by the search unit 54 is described with reference to FIG. 9. FIG. 9 schematically shows a flow of search processing according to Variation 3.

The search screen 130 shown in FIG. 1 displays identification information regarding tools, the usable time of the tools, the current time of usage of the tools, and the remaining lifespan of the tools as search results. In contrast, a search screen 130C according to this variation also displays storage locations of the tools as search results.

More specifically, the search unit 54 acquires tool information that matches the input search condition from the tool database 123. The search unit 54 then searches the storage information 175 for the storage location of each tool using the identification information regarding the tools specified in the tool information as a key. Subsequently, the search unit

54 displays information regarding the tools that match the search condition and the storage locations of the tools side by side on the search screen 130C.

H. Specific Example of Search Screen 130

Figure 10:
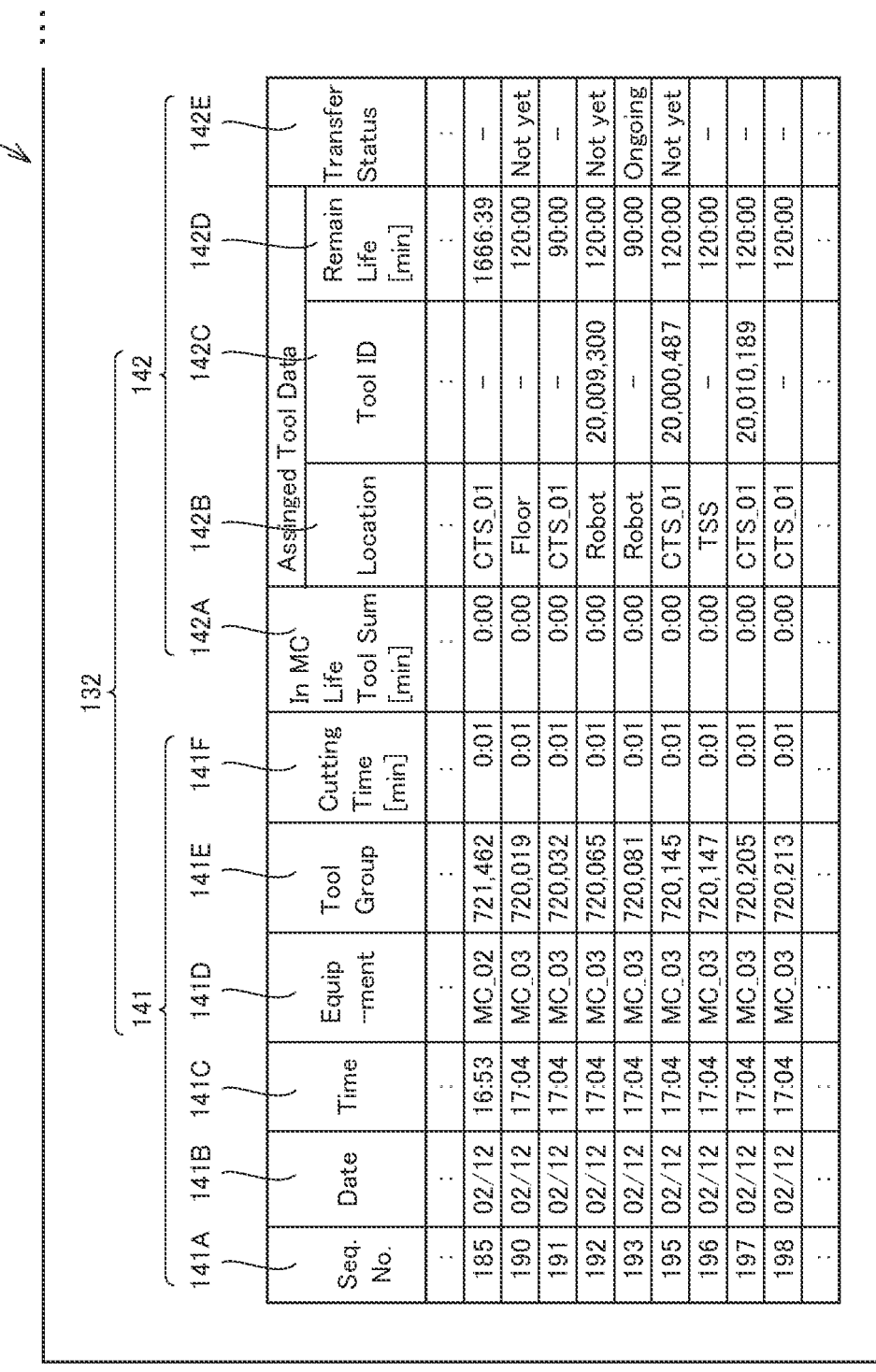
FIG. 10 shows a left part of the search screen.
Figure 11:
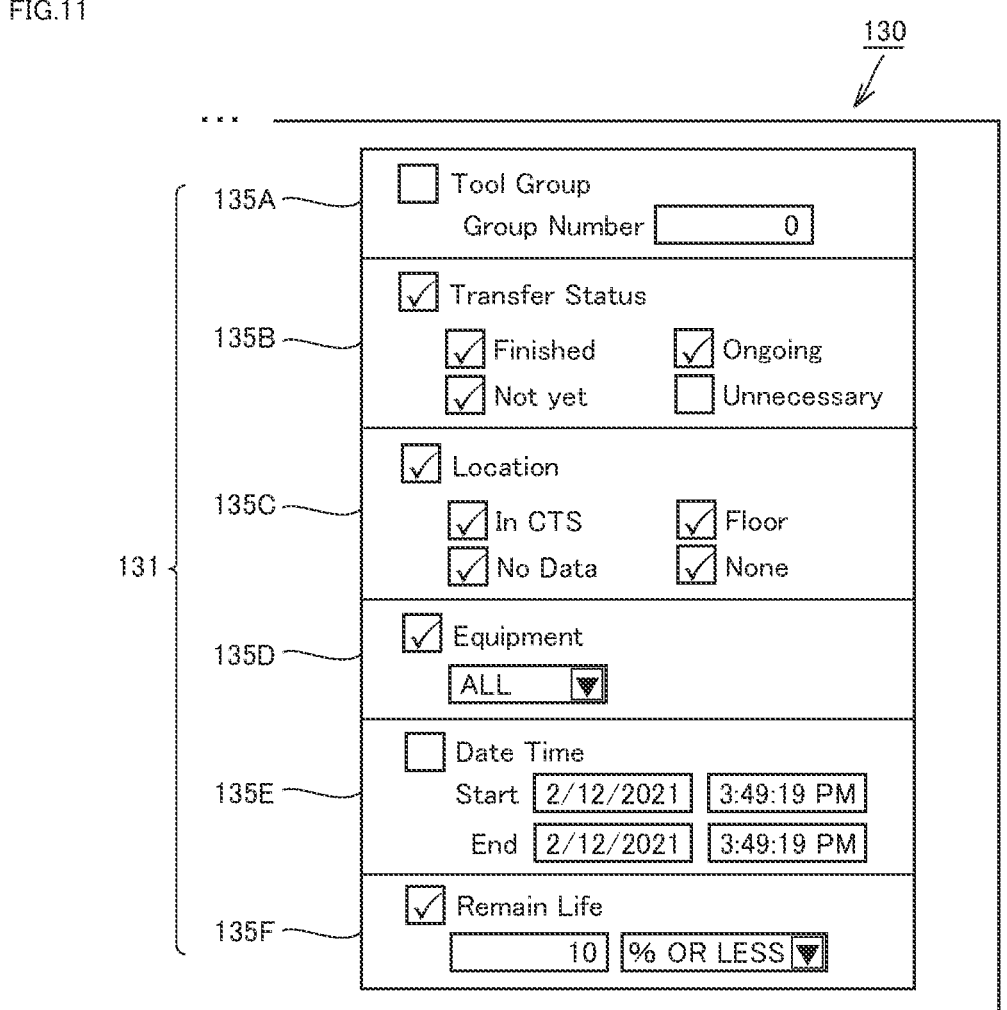
FIG. 11 shows a right part of the search screen.

Next, a specific example of the search screen 130 is described with reference to FIGS. 10 and 11. FIG. 10 shows a left part of the search screen 130. FIG. 11 shows a right part of the search screen 130.

The search screen 130 includes the input area 131 for search conditions and a display field 132 for search results. The input area 131 for search conditions is constituted by input fields 135A to 135F.

The input field 135A accepts input of a tool classification as a search condition. The tool classification is input in the form of a group number, for example.

The input field 135B accepts input of a transfer status of a tool as a search condition. The transfer statuses that can be input include, for example, "Finished" indicating that transfer of the tool is complete, "Ongoing" indicating that the tool is currently being transferred, "Not yet" indicating that transfer of the tool is not yet complete, and "Unnecessary" indicating that the tool need not be transferred.

The input field 135C accepts input of a tool storage location in or out of the tool storage section 250 as a search condition. The tool storage locations that can be input include "In CTS" indicating that the tool is stored in the tool storage section 250, "Floor" indicating a different location other than the tool transfer system 10, "No Data" indicating that data of the storage location of the tool is not registered, and "None" indicating that the storage location of the tool is unknown.

The input field 135D accepts input of a tool storage location in or out of the machine tools 400 as a search condition. The tool storage locations that can be input include "All" indicating all of the machine tools 400, and "MC_01", "MC_02", and "MC_03" indicating identification information regarding specific machine tools 400.

The input field 135E accepts input of the date and time range of the scheduled machining time. The date and time range is designated by either the start date and time or the end date and time.

The input field 135F accepts input of a remaining lifespan condition. The remaining lifespan condition is input in the form of a combination of a numerical value and a unit, for example. The unit may be "% or less", "% or more", "minutes or less", "minutes or more", or the like. For example, if a combination of a numerical value "10" and a unit "% or less" is input as the remaining lifespan condition, the search unit 54 recognizes that a search condition that the remaining lifespan proportion is "10% or less" has been designated. In another example, if a combination of a numerical value "10" and a unit "minutes or less" is input, the search unit 54 recognizes that a search condition that the remaining lifespan proportion is "10 minutes or less" has been designated.

The search unit 54 searches the tool database 123 for tool information that matches the search condition input in the input area 131, and outputs the search results in the display field 132.

The display field 132 for search results includes a display field 141 related to machining schedules, and a display field 142 related to tool information.

In the display field 141, part of or all information specified in the aforementioned machining schedule 124 is displayed as search results. As an example, the display field 141 includes a sequence number 141A indicating the execution order of machining tasks, date information 141B indicating a machining date, machining start information 141C indicating a machining start time, identification information 141D regarding a machine tool that performs machining, classification 141E of a tool used in machining, and machining time information 141F indicating a time required for machining.

In the display field 142, part of or all information specified in the aforementioned tool database 123 is displayed as search results. As an example, the display field 142 includes amount-of-usage information 142A indicating the amount by which a tool has been used in machining since the new state to the present, storage location information 142B indicating the storage location of the tool, identification information 142C regarding the tool, remaining lifespan information 142D indicating the remaining lifespan of the tool, and 142E indicating the transfer status of the tool.

I. Process of Delivering Tools to Tool Storage Section 250

Figure 12:
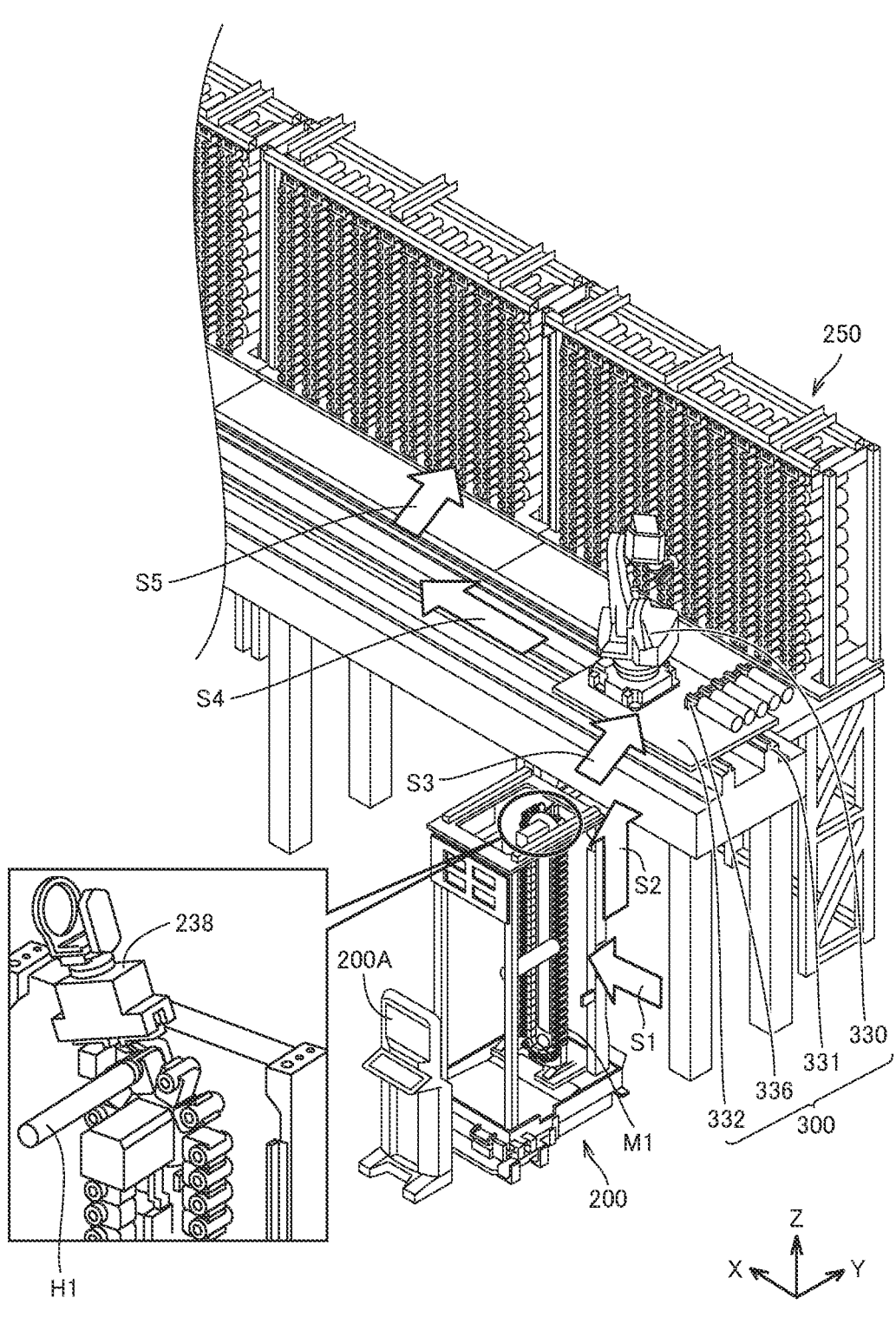
FIG. 12 schematically shows a flow of a process of delivering a tool holder from a work station to a tool storage section.

Next, a process of delivering a tool holder from the workstation 200 to the tool storage section 250 is described with reference to FIG. 12. FIG. 12 schematically shows a flow of a process of delivering a tool holder from the workstation 200 to the tool storage section 250.

In step S1, the worker sets a tool holder H1 to be delivered to a magazine M1 in the workstation 200. The number of tool holders that can be stored in the workstation 200 is smaller than the number of tool holders that can be stored in the tool storage section 250.

A reader device (not shown) for reading a bar code or a QR code (registered trademark) is provided near the location where the worker sets the tool holder H1 to the magazine M1. The reader device reads a bar code or a QR code attached to the tool holder H1. Identification information regarding the tool holder H1 to be delivered is thus read. After completing the setting of the tool holder H1, the worker performs a completion operation to the operation terminal 200A.

Next, in step S2, the controller 50 controls the motor 235A (see FIG. 3) and drives the magazine M1 in the workstation 200. The controller 50 thus moves the tool holder H1 to be delivered to a predetermined tool replacement position. The ATC 238 is provided near the tool replacement position. The ATC 238 detaches the tool holder H1 at the tool replacement position from the magazine M1 and makes a half turn.

Next, in step S3, the arm robot 330 detaches the tool holder H1 from the ATC 238 and places the tool holder H1 in a temporary storage place 336 on the shuttle 332. If there is another tool holder to be delivered, the process in steps S1 to S3 is repeated as long as the maximum storable number of the temporary storage place 336 is not exceeded.

Next, in step S4, the controller 50 controls the motor 335A to drive the shuttle 332. The controller 50 thus moves the shuttle 332 to an instructed tool delivery position. The tool delivery position is determined based on the aforementioned storage information 175 (see FIG. 6), for example.

The controller 50 references a vacant storage location specified in the storage information 175 and determines the storage destination of the tool holder H1. If there are a plurality of vacant storage locations, the controller 50 may determine, as the storage destination, one storage location randomly selected from among the plurality of vacant storage locations, or determine, as the storage destination, one storage location that is closer to the transfer device 300 and selected from among the plurality of vacant storage locations.

Next, in step S5, the arm robot 330 detaches the tool holder H1 to be delivered from the temporary storage place 336 and stores the tool holder H1 in the determined storage destination. Thereafter, the controller 50 updates the storage information 175 by associating the identification information regarding the tool holder H1 with the corresponding storage location.

If another tool holder to be delivered remains in the temporary storage place 336, the controller 50 repeats the process in steps S4 and S5 until no tool holder is left on the temporary storage place 336.

J. Process of Delivering Tools to Machine Tool 400

Figure 13:
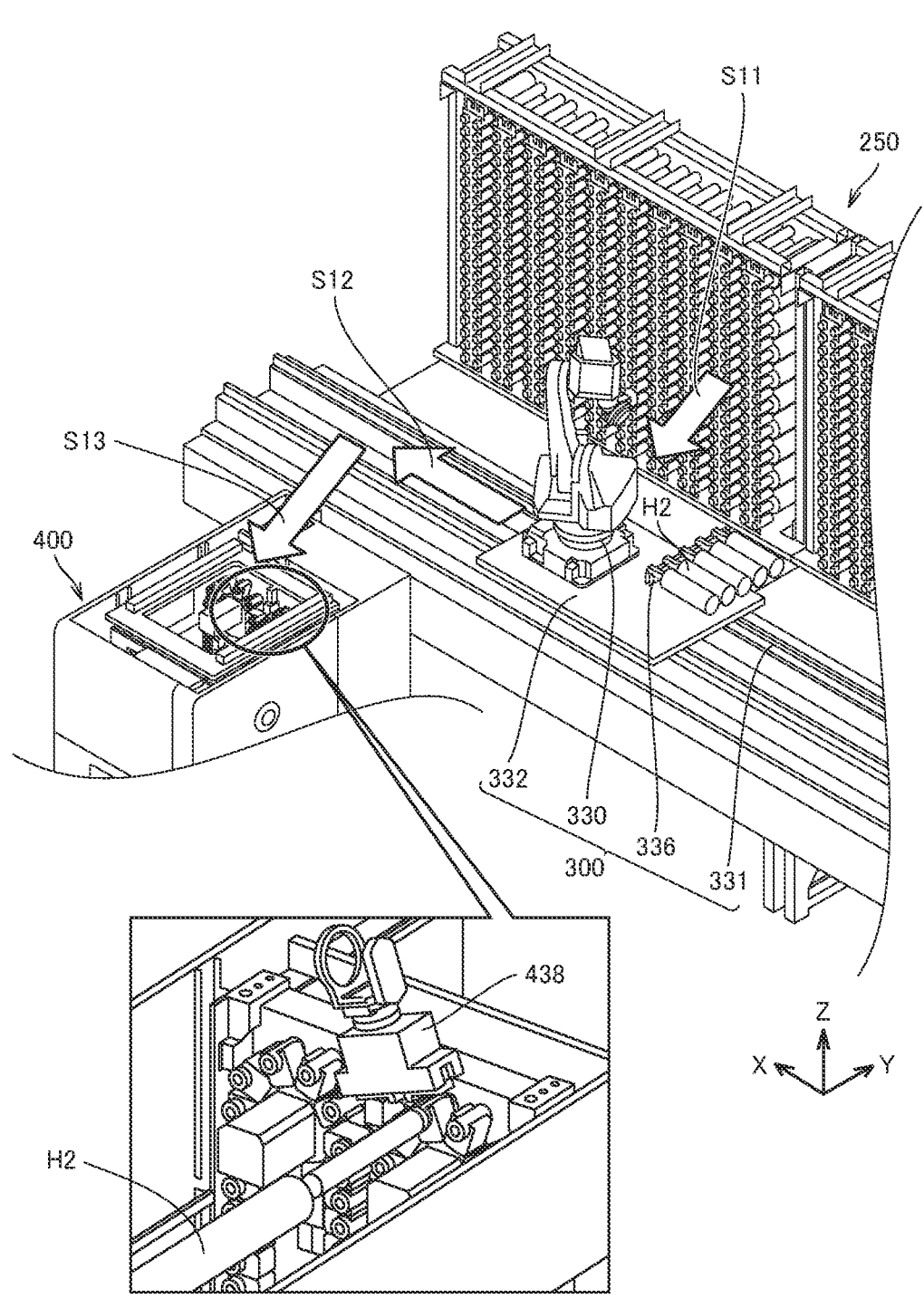
FIG. 13 schematically shows a flow of a process of delivering a tool holder from the tool storage section to a machine tool.

Next, a mode of delivering a tool holder following FIG. 12 is described with reference to FIG. 13. FIG. 13 schematically shows a flow of a process of delivering a tool holder from the tool storage section 250 to the machine tool 400.

It is assumed that at a certain timing the controller 50 receives an instruction to deliver a tool holder to the machine tool 400. For example, the worker designates, on the operation terminal 200A, the tool to be delivered and the machine tool 400 that is the transfer destination. If there are more than one tool holder holding the tool designated by the worker in the tool storage section 250, the controller 50 identifies a tool holder to be delivered. It is assumed that a tool holder H2 is thus identified as a tool to be delivered. In this case, the controller 50 identifies the storage location of the tool holder H2 from the aforementioned storage information 175 (see FIG. 6). Thereafter, the controller 50 drives the shuttle 332 by controlling the motor 335A (see FIG. 3), and moves the shuttle 332 to the front of the storage location of the tool holder H2.

Next, in step S11, the arm robot 330 takes out the tool holder H2 to be delivered from the tool storage section 250 and places the tool holder H2 in the temporary storage place 336 on the shuttle 332.

Next, in step S12, the controller 50 drives the shuttle 332 to the position of the machine tool 400 that is the delivery destination by controlling the motor 335A.

Next, in step S13, the arm robot 330 passes the tool holder H2 to the ATC 438 provided in the machine tool 400 that is the transfer destination. Thereafter, the ATC 438 attaches the tool holder H2 received from the arm robot 330 to the ATC 438 in the machine tool 400. Thereafter, the ATC 438 sets the tool holder H2 to a magazine in the machine tool 400. The tool holder H2 thus becomes available in the machine tool 400.

K. Process of Moving Tool to Workstation 200

Figure 14:
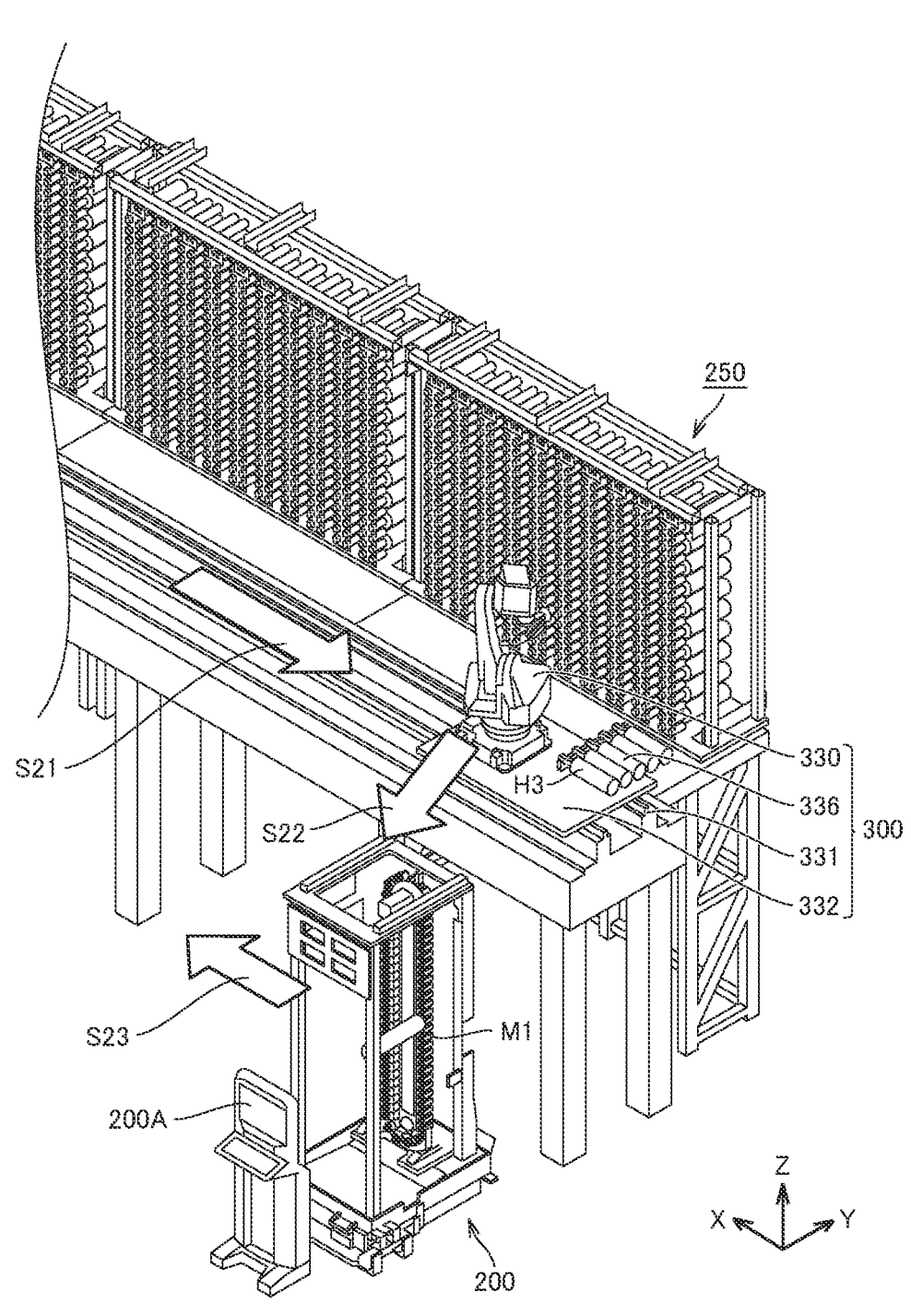
FIG. 14 schematically shows an example of a mode of removing a tool holder from the machine tool and moving the removed tool holder to the tool holder.

Next, a process of removing a tool holder is described with reference to FIG. 14. FIG. 14 schematically shows a flow of a process of removing a tool holder from the machine tool 400 and moving the removed tool holder to the workstation 200.

It is assumed that at a certain timing the controller 50 receives an instruction to retrieve a tool holder. Based on this, the controller 50 identifies a tool holder to be retrieved from among tool holders stored in the tool storage section 250 or the machine tool 400. It is assumed that, as a result, a tool holder H3 is identified as the tool holder to be retrieved. The controller 50 references the aforementioned storage information 175 (see FIG. 6) and identifies a storage destination of the tool holder H3. Thereafter, the controller 50 drives the shuttle 332 by controlling the aforementioned motor 335A (see FIG. 3) and moves the shuttle 332 to the storage destination of the tool holder H3. Next, the arm robot 330 takes out the tool holder H3 from the storage destination and places the tool holder H3 in the temporary storage place 336 on the shuttle 332. Further, the controller 50 deletes identification information regarding the tool holder H3 from the storage information 175 and makes empty an entry corresponding to the storage location of the tool holder H3.

Next, in step S21, the controller 50 drives the shuttle 332 by controlling the aforementioned motor 335A, and moves the shuttle 332 from the storage destination of the tool holder H3 to the front of the workstation 200.

Next, in step S22, the arm robot 330 detaches each tool holder H3 to be removed from the temporary storage place 336 and attaches the tool holder H3 to the aforementioned ATC 238 (see FIG. 12) in the workstation 200. Thereafter, the ATC 238 attaches the tool holder H3 to the magazine M1 of the workstation 200.

Next, in step S23, the controller 50 drives the magazine M1 by controlling the aforementioned motor 235A, and moves the tool holder H3 to be removed to an exit. Thereafter, the worker takes out the tool holder H3 to be removed from the exit.

L. Hardware Configuration of Management Device 100

Figure 15:
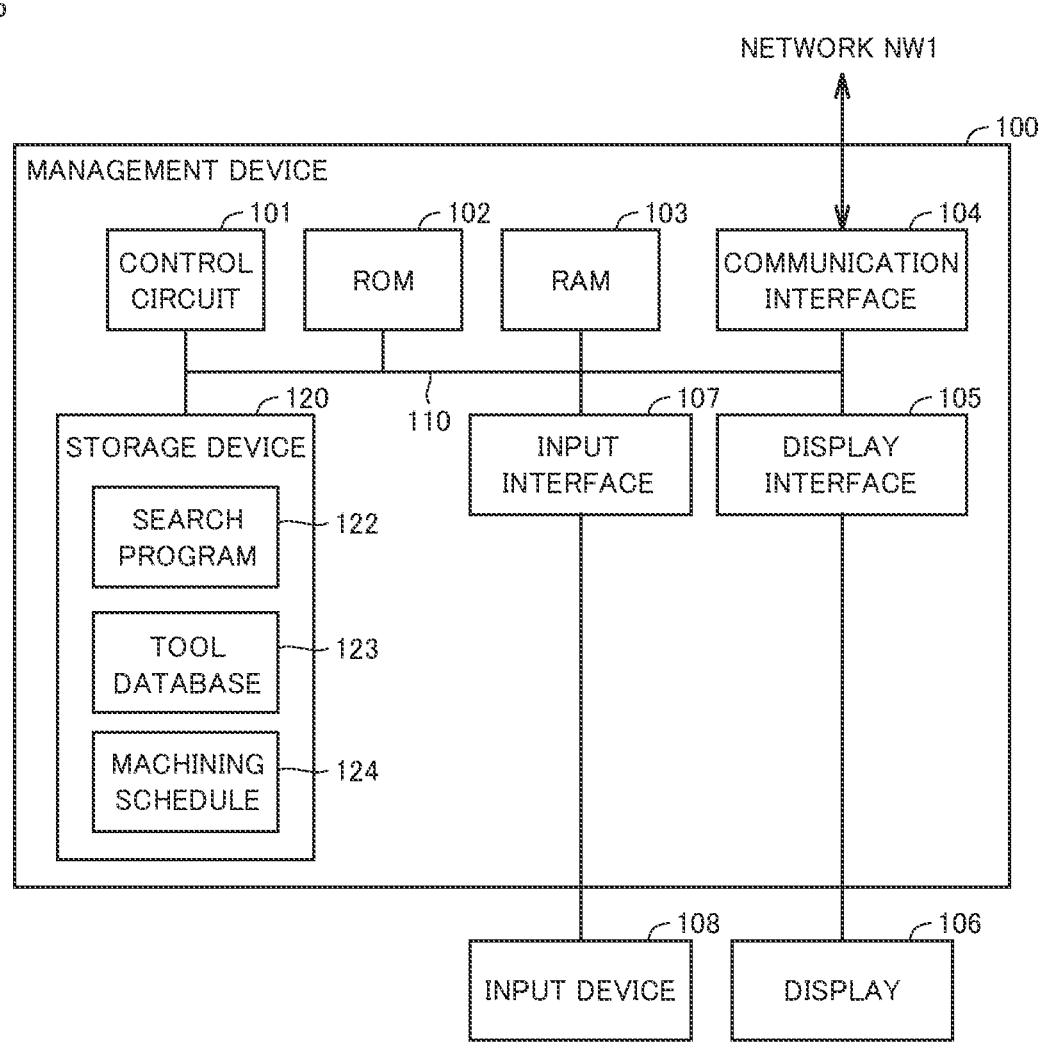
FIG. 15 is a schematic diagram showing an example of a hardware configuration of a management device.

Next, a hardware configuration of the management device 100 shown in FIG. 2 is described with reference to FIG. 15. FIG. 15 is a schematic diagram showing an example of a hardware configuration of the management device 100.

The management device 100 includes a control circuit 101, a ROM (Read Only Memory) 102, a RAM (Random Access Memory) 103, a communication interface 104, a display interface 105, an input interface 107, and a storage device 120. These components are connected to a bus 110.

The control circuit 101 is constituted by at least one integrated circuit, for example. The integrated circuit may be constituted by, for example, at least one CPU (Central Processing Unit), at least one GPU (Graphics Processing Unit), at least one ASIC (Application Specific Integrated Circuit), at least one FPGA (Field Programmable Gate Array), or a combination thereof.

The control circuit 101 controls operation of the management device 100 by executing a search program 122 and various programs, such as an operating system. The control circuit 101 loads the search program 122 from the storage device 120 or the ROM 102 to the RAM 103 in response to receiving a command to execute the search program 122. The RAM 103 functions as a working memory and temporarily stores various data necessary for executing the search program 122.

A LAN (Local Area Network), an antenna, or the like is connected to the communication interface 104. The management device 100 is connected to the network NW1 via the communication interface 104. With this, the management device 100 exchanges data with external devices connected to the network NW1. The external device includes, for example, the PLC 150, a server (not shown), or the like.

A display 106 is connected to the display interface 105. The display interface 105 sends an image signal for displaying an image to the display 106 in accordance with an instruction from the control circuit 101 or the like. The display 106 displays, for example, an operation screen for accepting an instruction to retrieve a tool holder, a selection screen for designating a tool holder to be delivered, or the like. The display 106 is, for example, a liquid crystal display, an organic EL (Electro Luminescence) display, or other display equipment. Note that the display 106 may be integrated with the management device 100, or may be separate from the management device 100.

An input device 108 is connected to the input interface 107. The input device 108 is, for example, a mouse, a keyboard, a touch panel, or other device capable of accepting user operations. Note that the input device 108 may be integrated with the management device 100, or may be separate from the management device 100.

The storage device 120 is, for example, a storage medium such as a hard disk or a flash memory. The storage device 120 stores the search program 122, the aforementioned tool database 123, the aforementioned machining schedule 124, or the like. The storage locations thereof are not limited to the storage device 120, and may alternatively be stored in a storage area (e.g. cache memory etc.) of the control circuit 101, the ROM 102, the RAM 103, or any other device (e.g. server, PLC 150, or operation terminal 200A).

The search program 122 is a program for realizing the aforementioned search function. The search program 122 may be provided not as a standalone program but as a part of any program. In this case, transfer control processing based on the search program 122 is realized in cooperation with that program. Even if a program that does not include such a part of a module is used, it does not deviate from the gist of the search program 122 according to this embodiment. Furthermore, some or all of the functions provided by the search program 122 may be realized by dedicated hardware. Furthermore, the management device 100 may be configured in a form such as a so-called cloud service in which at least one server executes a part of processing of the search program 122.

M. Hardware Configuration of PLC 150

Figure 16:
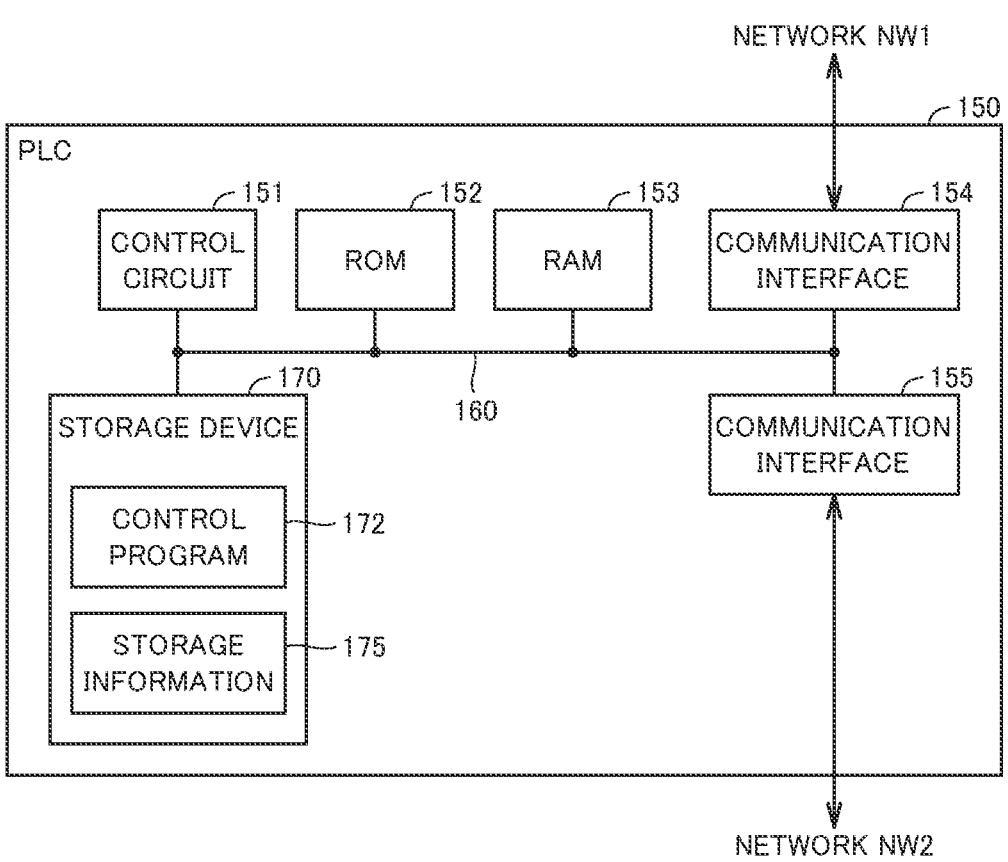
FIG. 16 is a block diagram showing a main hardware configuration of a PLC (Programmable Logic Controller).

Next, a hardware configuration of the PLC 150 shown in FIG. 2 is described with reference to FIG. 16. FIG. 16 is a block diagram showing a main hardware configuration of the PLC 150.

The PLC 150 includes a control circuit 151, a ROM (Read Only Memory) 152, a RAM (Random Access Memory) 153, communication interfaces 154 and 155, and a storage device 170. These components are connected to a bus 160.

The control circuit 151 is constituted by at least one integrated circuit. The integrated circuit may be constituted by, for example, at least one CPU, at least one MPU (Micro Processing Unit), at least one ASIC (application), at least one FPGA, or a combination thereof.

The control circuit 151 controls operations of the transfer device 300 and the machine tool 400 by executing a control program 172 and various programs. The control circuit 151 loads the control program 172 from the storage device 170 to the ROM 152 in response to receiving a command to execute the control program 172. The RAM 153 functions as a working memory and temporarily stores various data necessary for executing the control program 172.

A LAN, an antenna, or the like is connected to the communication interface 154. The PLC 150 is connected to the network NW1 via the communication interface 154. With this, the PLC 150 exchanges data with an external device connected to the network NW1. The external device includes, for example, the management device 100, a server (not shown), or the like.

The communication unit 155 is a communication interface for connection to the network NW2. The PLC 150 exchanges data with the external device connected to the network NW2 via the communication interface 155. The external device includes, for example, any of the aforementioned remote I/O units 71 to 73.

The storage device 170 is, for example, a storage medium such as a hard disk or a flash memory. The storage device 170 stores the control program 172, the aforementioned storage information 175, or the like. The storage location of the control program 172, the tool information 174, and the storage information 175 is not limited to the storage device 170, and may alternatively be stored in a storage area (e.g. cache memory etc.) of the control circuit 151, the ROM 152, the RAM 153, or any other device (e.g. server).

N. Hardware Configuration of Operation Terminal 200A

Figure 17:
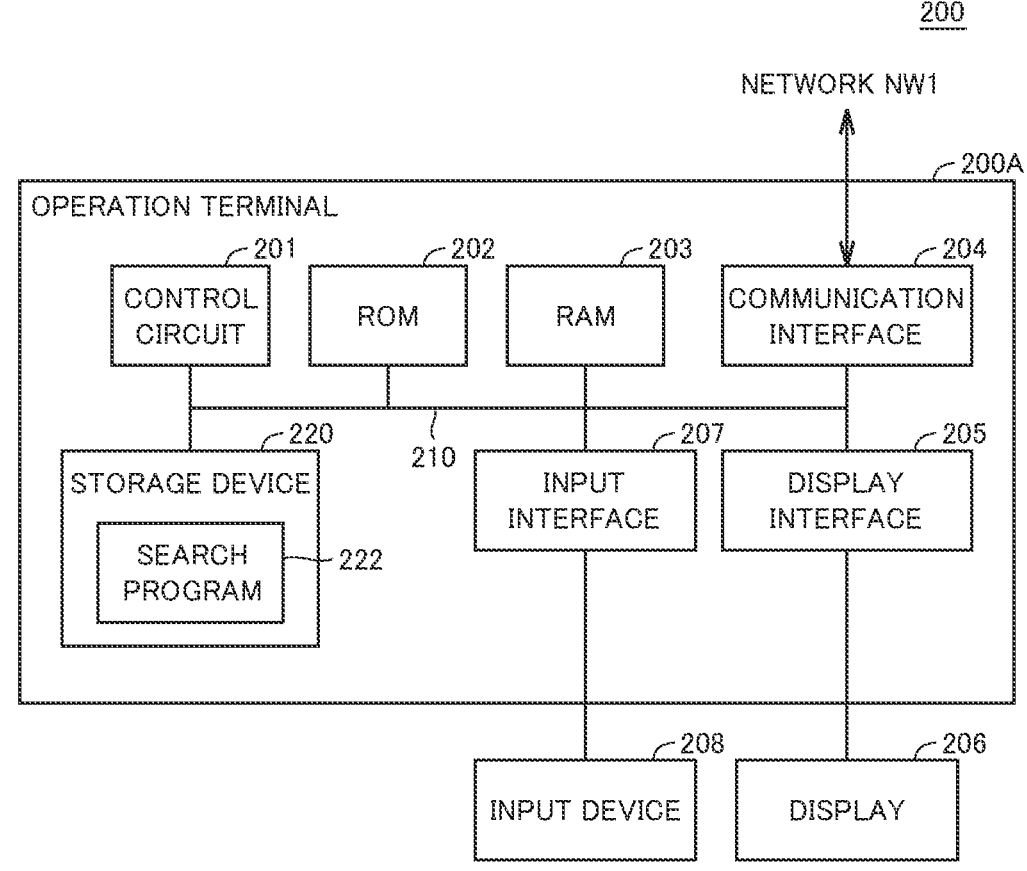
FIG. 17 is a schematic diagram showing an example of a hardware configuration of an operation terminal.

A hardware configuration of the operation terminal 200A shown in FIG. 1 is described with reference to FIG. 17. FIG. 17 is a schematic diagram showing an example of a hardware configuration of the operation terminal 200A.

The operation terminal 200A includes a control circuit 201, a ROM 202, a RAM 203, a communication interface 204, a display interface 205, an input interface 207, and a storage device 220. These components are connected to a bus 210.

The control circuit 201 is constituted by at least one integrated circuit, for example. The integrated circuit may be constituted by, for example, at least one CPU, at least one GPU, at least one ASIC, at least one FPGA, or a combination thereof.

The control circuit 201 controls operations of the operation terminal 200A by executing a search program 222 and various programs such as an operating system. The control circuit 201 loads the search program 222 from the storage device 220 or the ROM 202 to the RAM 203 in response to receiving a command to execute the search program 222. The RAM 203 functions as a working memory and temporarily stores various data necessary for executing the search program 222.

A LAN, an antenna, or the like is connected to the communication interface 204. The operation terminal 200A is connected to the network NW1 via the communication interface 204. With this, the operation terminal 200A exchanges data with an external device connected to the network NW1. The external device includes, for example, the PLC 150, a server (not shown), or the like.

A display 206 is connected to the display interface 205. The display interface 205 sends an image signal for displaying an image to the display 206 in accordance with an instruction from the control circuit 201 or the like. The display 206 displays, for example, an operation screen for accepting an instruction to retrieve a tool holder, a tool selection screen for designating a tool holder to be delivered, a machine tool selection screen for designating a machine tool 400 that is a delivery destination, or the like. The display 206 is, for example, a liquid crystal display, an organic EL display, or other display equipment. Note that the display 206 may be integrated with or separate from the operation terminal 200A.

An input device 208 is connected to the input interface 207. The input device 208 is, for example, a mouse, a keyboard, a touchscreen, or other device capable of accepting user operations. Note that the input device 208 may be integrated with or separate from the operation terminal 200A.

The storage device 220 is, for example, a storage medium such as a hard disk or a flash memory. The storage device 220 stores the search program 222 or the like. The storage location of the search program 222 is not limited to the storage device 220, and may alternatively be stored in a storage area (e.g. cache memory etc.) of the control circuit 201, the ROM 202, the RAM 203, the management device 100, the PLC 150, an external device (e.g. server), or the like.

The search program 222 is a program for realizing the aforementioned search function. The search program 222 may be provided not as a standalone program but as a part of any program. In this case, transfer control processing based on the search program 222 is realized in cooperation with that program. Even if a program that does not include such a part of a module is used, it does not deviate from the gist of the search program 222 according to this embodiment. Furthermore, some or all of the functions provided by the search program 222 may be realized by dedicated hardware. Furthermore, the operation terminal 200A may be configured in a form such as a so-called cloud service in which at least one server executes a part of processing of the search program 222.

O. Tool Information Search Flow

Figure 18:
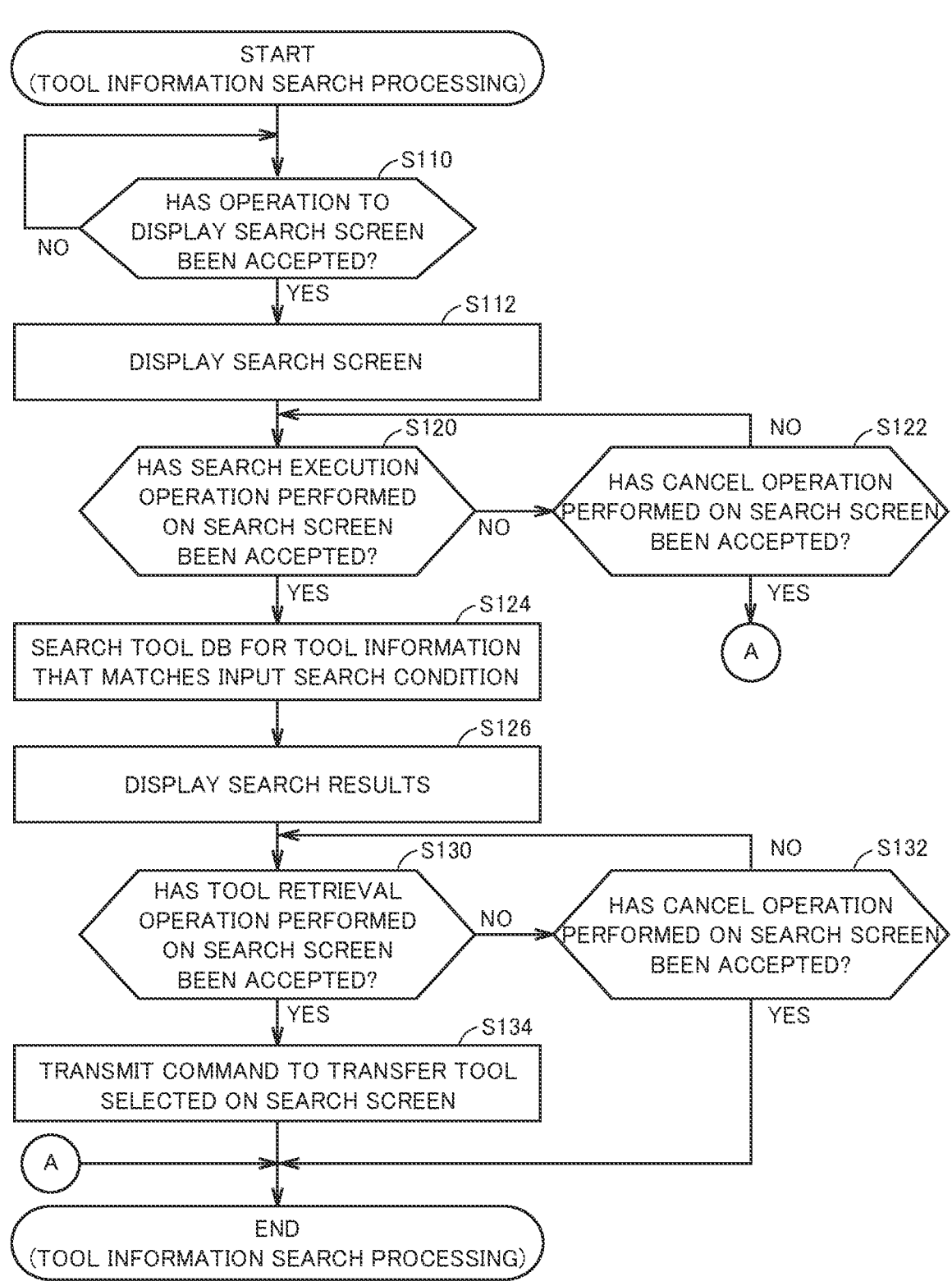
FIG. 18 is a flowchart showing a flow of tool information search processing.

Next, a tool information search flow is described with reference to FIG. 18. FIG. 18 is a flowchart showing a flow of tool information search processing.

The search processing shown in FIG. 18 is performed by the control circuit 101 of the management device 100 executing the aforementioned search program 122. Alternatively, the search processing shown in FIG. 18 may be realized by the control circuit 201 of the operation terminal 200A executing the aforementioned search program 222. Alternatively, a part or the entirety of the processing may be executed by a circuit element or other hardware.

In step S110, the control circuit 101 determines whether or not the control circuit 101 has accepted an operation to display the aforementioned search screen 130. As an example, the control circuit 101 determines that the control circuit 101 has accepted an operation to display the search screen 130 based on the search program 122 being executed. If the control circuit 101 determines that the control circuit 101 has accepted an operation to display the search screen 130 (YES in step S110), the control circuit 101 switches control to step S112. If not (NO in step S110), the control circuit 101 executes processing in step S110 again.

In step S112, the control circuit 101 causes the display 106 to display the search screen 130 for tool information. As mentioned above, the search screen 130 enables input of search conditions for tool information. Search conditions that can be input include, for example, a search condition related to the remaining lifespan of a tool.

In step S120, the control circuit 101 determines whether or not the control circuit 101 has accepted a search execution operation performed on the search screen 130. As an example, a search execution operation is performed by pressing a search execution button 131A in the search screen 130. If the control circuit 101 determines that the control circuit 101 has accepted a search execution operation performed on the search screen 130 (YES in step S120), the control circuit 101 switches control to step S124. If not (NO in step S120), the control circuit 101 switches control to step S122.

In step S122, the control circuit 101 determines whether or not the control circuit 101 has accepted a cancel operation performed on the search screen 130. As an example, a cancel operation is performed by closing the search screen 130. If the control circuit 101 determines that the control circuit 101 has accepted a cancel operation performed on the search screen 130 (YES in step S122), the control circuit 101 ends the search processing shown in FIG. 18. If not (NO in step S122), the control circuit 101 returns control to step S120.

In step S124, the control circuit 101 functions as the aforementioned search unit 54 and acquires tool information that satisfies the input search condition from the aforementioned tool database 123. As an example, if the input search condition is an upper limit of the remaining lifespan proportion, the control circuit 101 references tool information specified in the tool database 123 and acquires the maximum usable amount and the remaining lifespan of each tool. Next, the control circuit 101 calculates the proportion of the remaining lifespan to the maximum usable amount for each tool, and searches tool information with a remaining lifespan proportion that is lower than or equal to the upper limit.

In step S126, the control circuit 101 functions as the aforementioned search unit 54 and displays the results of the search processing in step S124 in the display field 132 of the search screen 130. As mentioned above, the search screen 130 is capable of accepting a selection operation to select each piece of tool information displayed in the display field 132. The tool corresponding to the selected piece of tool information is recognized as a tool to be retrieved.

In step S130, the control circuit 101 determines whether or not the control circuit 101 has accepted a tool retrieval operation performed on the search screen 130. As an example, a tool retrieval operation is performed by pressing the retrieval button 133 in the search screen 130. If the control circuit 101 determines that the control circuit 101 has accepted a tool retrieval operation performed on the search screen 130 (YES in step S130), the control circuit 101 switches control to step S134. If not (NO in step S130), the control circuit 101 switches control to step S132.

In step S132, the control circuit 101 determines whether or not the control circuit 101 has accepted a cancel operation performed on the search screen 130. As an example, a cancel operation is performed by closing the search screen 130. If the control circuit 101 determines that the control circuit 101 has accepted a cancel operation performed on the search screen 130 (YES in step S132), the control circuit 101 ends the search processing shown in FIG. 18. If not (NO in step S132), the control circuit 101 returns control to step S130.

In step S134, the control circuit 101 outputs, to the transfer device 300, a transfer command to cause the transfer device 300 to move each tool corresponding to the pieces of tool information selected in the search result display field to the workstation 200.

P. Summary

As described above, the machining system 1 according to the embodiment accepts input of a search condition related to the remaining lifespan of a tool on the search screen 130 for tool information. The machining system 1 identifies tools whose remaining lifespan satisfies the search condition among the tools specified in the tool database 123, based on the current amount of usage of each tool. Thereafter, the search screen 130 displays information regarding the identified tools as the search results.

The worker can search for tool information with the search condition related to the remaining lifespan by using the search function of the machining system 1. This allows the worker to understand not only tools that have reached the end of the lifespan thereof but also tools that are about to reach the end of the lifespan thereof. As a result, the worker can identify tools that are better to be replaced now.

The embodiment disclosed herein is illustrative in all respects and should not be considered restrictive. The scope of the present invention is defined by the claims, rather than the above description, and intended to encompass meanings equivalent to the claims and all changes made within the scope of the claims.

LIST OF REFERENCE NUMERALS

1 Machining system
5 Information processing device
10 Tool transfer system
50 Controller
52 Monitoring unit
54 Search unit
56 Transfer control unit
71 Remote I/O unit
72 Remote I/O unit
73 Remote I/O unit
100 Management device
101 Control circuit
102 ROM
103 RAM
104 Communication interface
105 Display interface
106 Display
107 Input interface
108 Input device
110 Bus
120 Storage device
122 Search program
123 Tool database
123A Tool database
123B Tool database
124 Machining schedule
130 Search screen
130A Search screen
130B Search screen
130C Search screen
131 Input area
131A Search execution button
132 Display field
132A Checkbox
133 Retrieval button
135A to 135F Input field
141 Display field
141A to 141F Sequence number
142 Display field
142A Amount-of-usage information
142B Storage location information
142C Identification information
142D Remaining lifespan information
151 Control circuit
152 ROM
153 RAM
154 Communication interface
155 Communication interface
160 Bus

170 Storage device
172 Control program
174 Tool information
175 Storage information
200 Workstation
200A Operation terminal
201 Control circuit
202 ROM
203 RAM
204 Communication interface
205 Display interface
206 Display
207 Input interface
208 Input device
210 Bus
220 Storage device
222 Search program
234 Motor driver
234A Motor driver
234B Motor driver
235 Motor
235A Motor
235B Motor
250 Tool storage section
300 Transfer device
330 Arm robot
331 Rail
332 Shuttle
334 Motor driver
334A Motor driver
334B Motor driver
335 Motor
335A Motor
335B Motor
336 Temporary storage place
400, 400A to 400F Machine tool
411 Motor driver
411A Motor driver
411B Motor driver
412 Motor
412A Motor
412B Motor
422 Machining program

The invention claimed is:

1. A machining system in which a plurality of tools are used to machine a workpiece, the system comprising:

a machine tool;

a tool storage section in which a plurality of tools are able to be stored;

a workstation for a worker to perform work for a tool;

a transfer device configured to transfer a designated tool from the machine tool, the tool storage section, or the workstation to a designated delivery destination which is one of the machine tool, the tool storage section, or the workstation;

a display unit capable of displaying a search screen for searching for a tool, the search screen being capable of accepting input of a search condition related to a remaining lifespan of a tool;

a search unit for searching for a tool whose remaining lifespan or amount of usage satisfies the search condition, among the plurality of tools, based on an amount of usage of each of the tools from a new state, and a transfer control unit configured to control the transfer device, wherein the search screen displays, as a search result, information regarding a tool that satisfies the search condition, wherein search targets on the search screen include a tool in the machine tool, a tool in the tool storage section, and a tool in the workstation, wherein the search screen is configured to accept a selection operation to select a piece of information regarding each tool displayed as the search result, and wherein the transfer device is an articulated robot including:

a set of rails coupling the machine tool, the tool storage section, and the workstation, a shuttle configured to move on the set of rails, and an arm robot fixed to the shuttle, wherein the transfer control unit is configured to:

in a first mode, identify, based on a machining schedule, a tool to be used by the machine tool, and cause the transfer device to deliver, by the shuttle moving on the set of rails, the tool to be used from the workstation or the tool storage section to the machine tool if the tool to be used is not present in the machine tool, and in a second mode, cause the transfer device to transfer, by the shuttle moving on the set of rails, a tool corresponding to the piece of information selected by the selection operation to the workstation.

2. The machining system according to claim 1, wherein information regarding each tool displayed as the search result on the search screen includes identification information regarding the tool, and a remaining lifespan of the tool or an amount of usage of the tool.

3. The machining system according to claim 2, wherein the information regarding each tool displayed as the search result on the search screen further includes information regarding a property of the tool.

4. The machining system according to claim 2, wherein the information regarding each tool displayed as the search result on the search screen further includes a classification of the tool.

5. The machining system according to claim 1, wherein the search unit searches for a tool whose remaining lifespan satisfies the search condition among the plurality of tools, and the search condition able to be input on the search screen includes at least one of a proportion of a remaining lifespan of a tool to a lifespan of the tool from a new state and a proportion of an amount of usage of the tool to the lifespan of the tool from the new state.

6. A search method for searching for a specific tool among a plurality of tools to be used in a machining system including:

a machine tool;

a tool storage section in which a plurality of tools are able to be stored;

a workstation for a worker to perform work for a tool;

a transfer device configured to transfer a designated tool from the machine tool, the tool storage section, or the workstation to a designated delivery destination which is one of the machine tool, the tool storage section, or the workstation; and a transfer control unit configured to control the transfer device;

the search method comprising:

a step of displaying a search screen for searching for a tool;

a step of accepting input of a search condition related to a remaining lifespan of a tool on the search screen;

a step of searching for a tool whose remaining lifespan or amount of usage satisfies the search condition, among the plurality of tools, based on an amount of usage of each of the tools from a new state;

a step of displaying information regarding a tool that satisfies the search condition as a search result on the search screen, wherein search targets on the search screen include a tool in the machine tool, a tool in the tool storage section, and a tool in the workstation, wherein the search screen is configured to accept a selection operation to select a piece of information regarding each tool displayed as the search result, and wherein the transfer device is an articulated robot including:

a set of rails coupling the machine tool, the tool storage section, and the workstation, a shuttle configured to move on the set of rails, and an arm robot fixed to the shuttle, wherein the transfer control unit is configured to:

in a first mode, identify, based on a machining schedule, a tool to be used by the machine tool, and cause the transfer device to deliver, by the shuttle moving on the set of rails, the tool to be used from the workstation or the tool storage section to the machine tool if the tool to be used is not present in the machine tool, and in a second mode, cause the transfer device to transfer, by the shuttle moving on the set of rails, a tool corresponding to the piece of information selected by the selection operation to the workstation.

7. A non-transitory recording medium storing a search program for searching for a specific tool among a plurality of tools to be used in a machining system including:

a machine tool;

a tool storage section in which a plurality of tools are able to be stored;

a workstation for a worker to perform work for a tool;

a transfer device configured to transfer a designated tool from the machine tool, the tool storage section, or the workstation to a designated delivery destination which is one of the machine tool, the tool storage section, or the workstation; and a transfer control unit configured to control the transfer device;

the search program causing a computer to execute:

a step of displaying a search screen for searching for a tool;

a step of accepting input of a search condition related to a remaining lifespan of a tool on the search screen;

a step of searching for a tool whose remaining lifespan or amount of usage satisfies the search condition, among the plurality of tools, based on an amount of usage of each of the tools from a new state;

a step of displaying information regarding a tool that satisfies the search condition as a search result on the search screen, wherein search targets on the search screen include a tool in the machine tool, a tool in the tool storage section, and a tool in the workstation, wherein the search screen is configured to accept a selection operation to select a piece of information regarding each tool displayed as the search result, and wherein the transfer device is an articulated robot including:

a set of rails coupling the machine tool, the tool storage section, and the workstation, a shuttle configured to move on the set of rails, and an arm robot fixed to the shuttle, wherein the transfer control unit is configured to:

in a first mode, identify, based on a machining schedule, a tool to be used by the machine tool, and cause the transfer device to deliver, by the shuttle moving on the set of rails, the tool to be used from the workstation or the tool storage section to the machine tool if the tool to be used is not present in the machine tool, and in a second mode, cause the transfer device to transfer, by the shuttle moving on the set of rails, a tool corresponding to the piece of information selected by the selection operation to the workstation.

\* \* \* \* \*